(12) United States Patent
Sakurai

(10) Patent No.: US 6,515,767 B1
(45) Date of Patent: Feb. 4, 2003

(54) DIGITAL SYNTHESIZER, DIGITAL COPIER AND MAGNIFICATION CONTROL UNIT

(75) Inventor: Tetsuo Sakurai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/173,876

(22) Filed: Jun. 19, 2002

Related U.S. Application Data

(62) Division of application No. 09/190,367, filed on Nov. 12, 1998.

(30) Foreign Application Priority Data

Nov. 17, 1997 (JP) .............................. 9-315679
Dec. 19, 1997 (JP) .............................. 9-351802
Oct. 12, 1998 (JP) ............................ 10-289733

(51) Int. Cl.$^7$ ...................... G06K 15/00; H04N 1/407; G06I 5/00
(52) U.S. Cl. .................. 358/1.9; 358/1.2; 358/1.5; 358/1.7; 358/3.26; 358/3.27; 347/110; 347/261
(58) Field of Search ................... 358/1.9, 3.26, 358/1.2, 1.5, 1.7, 410, 412, 409, 468; 347/261, 160, 167, 110

(56) References Cited

U.S. PATENT DOCUMENTS

| | | | |
|---|---|---|---|
| 4,543,643 A | * 9/1985 | Shibazaki et al. | 355/55 |
| 4,956,672 A | * 9/1990 | Shibazaki et al. | 355/55 |
| 5,251,045 A | * 10/1993 | Sakata | 358/401 |
| 5,311,259 A | * 5/1994 | Moriya et al. | 358/1.2 |
| 5,369,733 A | * 11/1994 | Arimoto et al. | 358/1.2 |
| 5,678,000 A | * 10/1997 | Ohtani | 358/1.12 |
| 5,809,381 A | * 9/1998 | Kimura | 355/55 |
| 5,887,126 A | * 3/1999 | Fujimoto | 358/1.12 |
| 6,307,579 B1 | * 10/2001 | Kida | 347/133 |
| 6,331,900 B1 | * 12/2001 | Kuno | 358/1.12 |

* cited by examiner

Primary Examiner—Edward Coles
Assistant Examiner—Tia A Carter
(74) Attorney, Agent, or Firm—Oblon, Spivak, McClelland, Maier & Neustadt, P.C.

(57) ABSTRACT

The digital synthesizer comprises a system control unit, a read control unit, and a write drive control unit, and based on a magnification fine adjustment value set using a magnification fine adjustment panel, in the copy mode, a magnification of an image in the main scanning direction is finely adjusted by controlling a write reference clock frequency for modulating a laser beam for image formation so that a desired pixel density is obtained and also a magnification of the image in the auxiliary scanning direction is finely adjusted by controlling a scan speed when reading an image from a document, while in the printer mode, a magnification of an image in the main scanning direction is finely adjusted by controlling a write reference clock frequency and also a magnification of the image in the auxiliary scanning direction is finely adjusted by controlling a rotational speed of a polygon mirror for scanning a photosensitive mirror with a write beam.

2 Claims, 16 Drawing Sheets

FIG.6

| MAGNIFICATION CORRECTION | | COPY | |
|---|---|---|---|
| VERTICAL | +0.5% | ⊞ ⊟ | ~352 |
| HORIZONTAL | −0.3% | ⊞ ⊟ | |

LCD SCREEN
( DURING COPY MODE )

DIGITAL SYNTHESIZER, DIGITAL COPIER AND MAGNIFICATION CONTROL UNIT

FIELD OF THE INVENTION

The present invention relates to a digital synthesizer, a digital copying machine (hereafter digital copier) as well as to a magnification control unit applicable to an image forming apparatus such as a copying machine, a printer, and a facsimile machine, and more specifically to a digital synthesizer, a digital copier, and a magnification control unit in which a magnification can finely be adjusted by a user so that an image with a desired magnification can be formed without generating a magnification error in the image.

BACKGROUND OF THE INVENTION

In digital synthesizers having functions as a copying machines or those as a printer, calibration for magnification as a copying machine is performed when shipping after manufacture in such a way that a magnification of a formed image will match to a desired magnification, namely so that there does not occur a magnification error. For instance, the magnification in the main scanning direction is calibrated by changing a clock frequency of a laser diode (LD) for writing data, and magnification in the auxiliary scanning direction is calibrated by changing a reading speed of a scanner in such a way that the magnification error is within 1%. Specifically, considering the fact that a document used in reality expands or shrinks due to a change in the humidity of the atmospheric air, and generally the magnification error is maintained at around 0.5%.

Magnification error when reading a document is around 0.3% in the main scanning direction due to the displacement of a CCD during calibration for magnification or aberration of a lens. The magnification error is around 0.1% in the auxiliary scanning direction due to a change in the tolerance of an outer diameter of a pulley when driving the scanner or the like. When writing a data, a magnification error of around 0.2 to 0.3% is generated in the auxiliary scanning direction due to a tolerance of a carrier roller and a difference in the transfer speed of the paper caused by slipping or the like. A magnification error of around 0.3 to 0.5% is generated according to the configuration of the optical system due to residual aberration of the operating system used for data writing (non-uniformity in fθ correction).

A magnification error also occurs due to shrinkage of in the paper when fixing an image. Shrinkage of the paper is generated because the moisture in the paper gets evaporated when the paper is heated during fixing. When the paper is left for a certain period of time after copying, the paper absorbs moisture from the atmospheric air and expands. The degree of expansion varies depending on the humidity in the atmospheric air or the way the paper is stored (when many papers are piled, those papers that are near a top and a bottom of the pile expand, but those inside the pile do not expand because they do not come in contact with the atmospheric air). Shrinkage of the paper occurs both in the main scanning direction and in the auxiliary scanning direction, and it is of the order of 0.4 to 0.5% in an ordinary paper, and in a case of a second original drawing (a semi-transparent paper such as tracing paper) sometimes the order may increase up to around 0.7 to 0.8%. In addition, shrinkage of a document due to humidity also causes a magnification error.

For the reasons as described above, it is important that the magnification of a digital synthesizer is calibrated accurately.

In the case of magnification calibration in a printer, as the types of documents outputted from a printer mainly comprises characters, there occurs no problems within a magnification error as a copying machine, so that specific calibration for magnification has not been made.

There is know a patent publication relating to the processing for size of an image which is the Japanese Patent Laid-Open Publication No. SHO 60-69957 titled "Laser Beam Recording Apparatus" that discloses a technology for changing the pixel density by a value in proportion to a rotational speed of a polygon mirror as a clock frequency in the main scanning direction. There is also known the Japanese Patent Laid-Open Publication No. SHO 60-120658 titled "Method of Changing Size of an Image Formed by a Semiconductor Laser Printer" that discloses a technology for changing the size of the printing characters by simultaneously changing the scanning speed of the light beam along with the amplitude of a laser beam from a semiconductor laser. There is also known the Japanese Patent Laid Open Publication No. SHO 62-161270 titled "Digital Copying Machine" that discloses a technology for executing the processing for changing size of an image in the main scanning direction when copying a document with changed size by providing a converting unit for varying a pixel frequency generated by an oscillator, processing the data in an image data processing section, and converting the pixel frequency in the converting unit.

In the prior art as described above, however, the magnification is calibrated before the digital synthesizer is shipped. Therefore, the calibration for magnification does not always satisfy the user's needs in practical use, and it is difficult to suppress the magnification error generated in association with conditions in practical use. In other words, as shrinkage of the paper depends on humidity, a degree of shrinkage varies according to the season, and in a case of a digital synthesizer having been used for a long period of time, displacement in installation thereof may cause a large magnification error, and calibration for magnification when shipping from a plant is not sufficient in order to preventing generation of a magnification error.

The digital synthesizer in which only a small paper size such as A3 or A4 is used, is used as a printer for outputting character data from a personal computer. However, a digital synthesizer in which a paper with large size of A2 or more can be used is recently often used as a printer for outputting CAD data, so that it is strongly required to reduce the magnification error to around 0.3% or below, and calibration of magnification when shipping from a plant is not sufficient for suppressing a magnification error generated during actual use thereof.

Furthermore, causes for generation of a magnification error when a digital synthesizer is used as a copying machine are different from those when the digital synthesizer is used as a printer, therefore, there is the problem that calibration for only one of the two applications (i.e. the copying and the printing) is insufficient. The cause of generation of the magnification error when a digital synthesizer is used as a copying machine is mainly the error in reading with a scanner, an error in forming an image, or a slip error in transporting a paper. However, when a digital synthesizer is used as a printer the cause of generation of the magnification error is mainly the error in forming an image and a slip error in transporting a paper.

Not only in a case of a digital synthesizer, but also in a case of an image forming apparatus like a digital copier, calibration for magnification does not always satisfy user's needs in practical use, and it has been disadvantageously difficult to suppress a magnification error generated depending on conditions in practical use.

SUMMARY OF THE INVENTION

It is an object of the present invention to make it possible to obtain an image having a small magnification error by enabling fine adjustment of a magnification by a user thereof so that an image with a desired magnification can be obtained without any magnification error.

It is another object of the present invention to obtain copy output and printer output with a stable magnification and also with high resolution by enabling fine adjustment of a magnification using a different method for a case when a digital synthesizer is used as a copier and for a case where the digital synthesizer is used as a printer respectively so that an image with a desired magnification can be obtained without any magnification error so that there will occur no magnification error in a formed image and an image with a desired magnification can be formed.

It is still another object of the present invention to enable fine adjustment of a magnification with high precision and also to simplify operations for fine adjustment of a magnification in an image forming apparatus such as a digital synthesizer.

The digital synthesizer according to the present invention comprises a mode switching unit for switching between a copy mode processing for reading image information from a document and forming an image according to the read image information and a printer mode processing for receiving arbitrary data from an external information processing device to generate image information for image formation and forming an image according to the generated image information; and a magnification fine adjustment unit for controlling different control objects in the copying mode processing and printer mode processing respectively and finely adjusting a magnification of an image to be formed. Thus, the magnification can finely be adjusted independently in each mode, therefore, a copy output and a printer output having a negligibly small magnification error can be obtained.

In the digital synthesizer according to the present invention comprises a magnification fine adjustment unit for changing in the copy processing mode a frequency of the write reference clock by controlling the write reference clock generating unit to finely adjust a magnification of an image in the main scanning direction, and/or changing a scanning speed for reading an image from the document by controlling the image reading unit to finely adjust a magnification of an image in the auxiliary scanning direction; and further for changing in the printer mode processing a frequency of the write reference clock by controlling the write reference clock generating unit to change a frequency of the write reference clock to finely adjust a magnification of an image in the main scanning direction and/or changing a rotational speed of the polygon mirror by controlling the rotation control unit to finely adjust a magnification of an image in the auxiliary scanning direction. Thus, the magnification can finely be adjusted independently in each operation mode, therefore, a copy output and a printer output having a negligibly small magnification error can be obtained.

The digital copier according to the present invention comprises a write driving control unit for finely adjusting a copying magnification in the scanning direction of a document by controlling the write reference clock generating unit according to a preset copying magnification for fine adjustment, and/or for finely adjusting a copying magnification in the auxiliary scanning direction of a document by changing a rotational speed of the polygon mirror and a frequency of the write reference clock by controlling the rpm control unit and write reference clock generating unit. Thus, a copying magnification in the main scanning direction as well as in the auxiliary scanning direction can finely be adjusted with high precision and high resolution under stable conditions.

In the magnification control unit according to the present invention, a user can select either the processing for changing a rotational speed of a polygon mirror and a write reference clock frequency at a constant state regardless of a copying magnification or the processing for changing a rotational speed of a polygon mirror and a write reference clock frequency by each 1/M step (M: Copying magnification). Therefore, a user can realize operations for size change convenient for a user, and a user can easily obtain a copy output with a small magnification error desired by the user.

Other objects and features of this invention will become apparent from the following description with reference to the accompanying drawings.

BRIEF DESCRIPTION OF THE DRAWINGS

FIG. 6 shows a magnification fine adjustment panel provided in the digital synthesizer according to Embodiment 1 of the present invention;

DESCRIPTION OF THE PREFERRED EMBODIMENTS

Next detailed description is made for embodiments of the digital synthesizer, digital copier and magnification control unit each according to the present invention.

The digital synthesizer according to Embodiment 1 of the present invention comprises an image reader and an image forming apparatus, and is operable in at least two types of operation modes. In the copy mode the digital synthesizer operates as a copying machine and in the printer mode the digital synthesizer operates as a printer. This digital synthesizer, when it is in copy mode, has a function to change a write reference clock frequency for modulating a laser beam for writing image information on a photosensitive substrate to a desired pixel density, a function to change a scanning speed in reading an image from a document for fine adjustment of a magnification of an image in the auxiliary scanning direction. When the digital synthesizer is in printer mode it has a function to change a write reference clock frequency for a write reference clock frequency for modulating a laser beam for writing image information on a photosensitive body for adjusting a magnification of an image in the main scanning direction, and a function for changing a rotational speed of a polygon mirror for scanning a photosensitive body using a laser beam generated according to image information for fine adjustment of a magnification of an image in the auxiliary direction.

Figure 1:
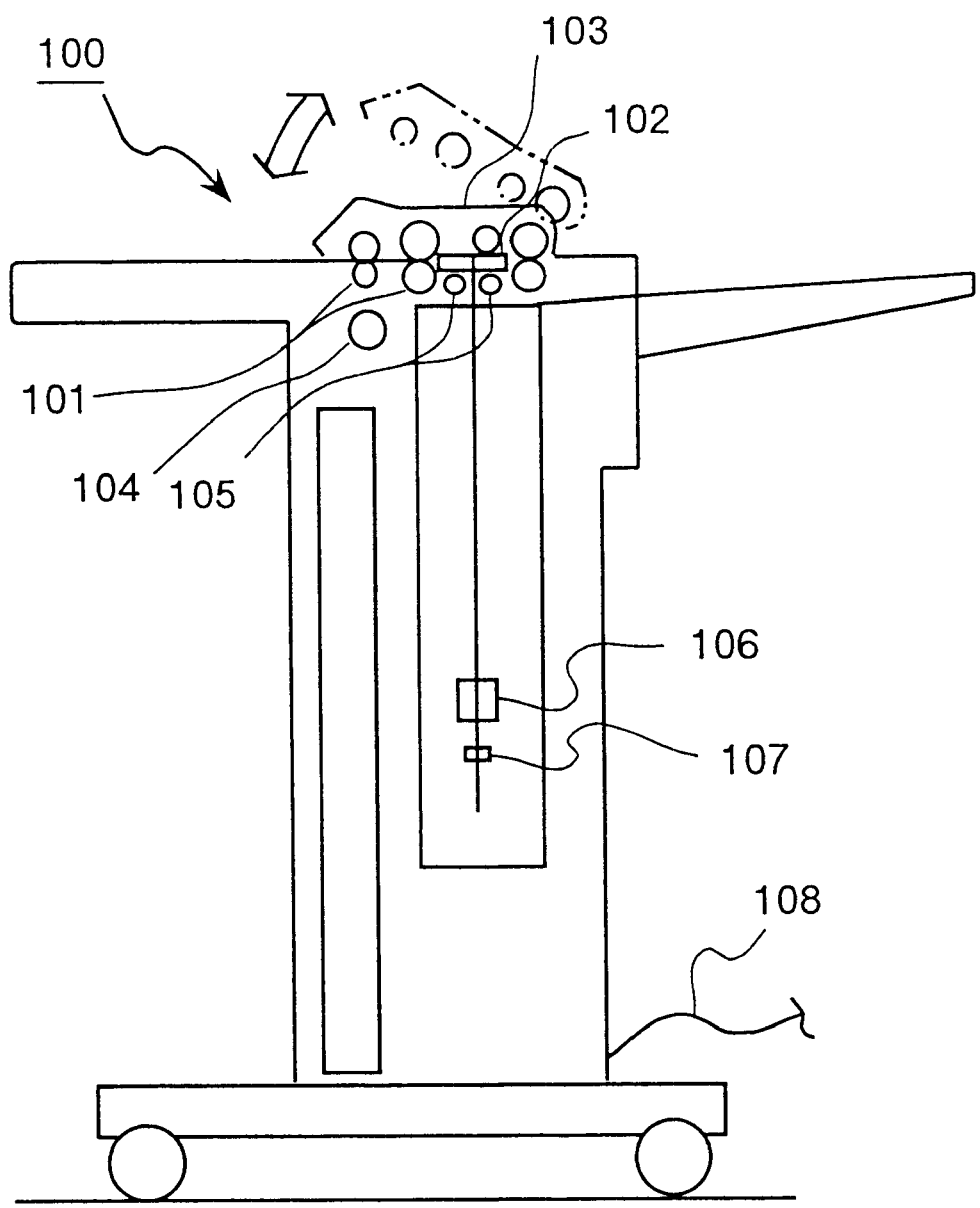
FIG. 1 is a diagram showing the constitution of an image reader constituting a digital synthesizer according to Embodiment 1 of the present invention.

FIG. 1 shows the constitution of an image reader constituting a digital synthesizer according to Embodiment 1 of the present invention. The image reader 100 shown in FIG. 1 comprises a motor 104 for transporting a document, when the document is inserted between the rollers 101 and an instruction for starting a copying operation is inputted, by driving the rollers 101 in the auxiliary scanning direction between a contact glass 102 and a reflection plate 103, a light source 105 for scanning the document in the main scanning direction by irradiating a laser beam onto the document being transported by the rollers 101, and a CCD 107 for reading a reflected light from the document, namely an image of the document formed though a lens 106. It should be noted that, in FIG. 1, the reference numeral 108 indicates a communication line for connection between the image reader 100 and an image forming apparatus described hereinafter.

Figure 2:
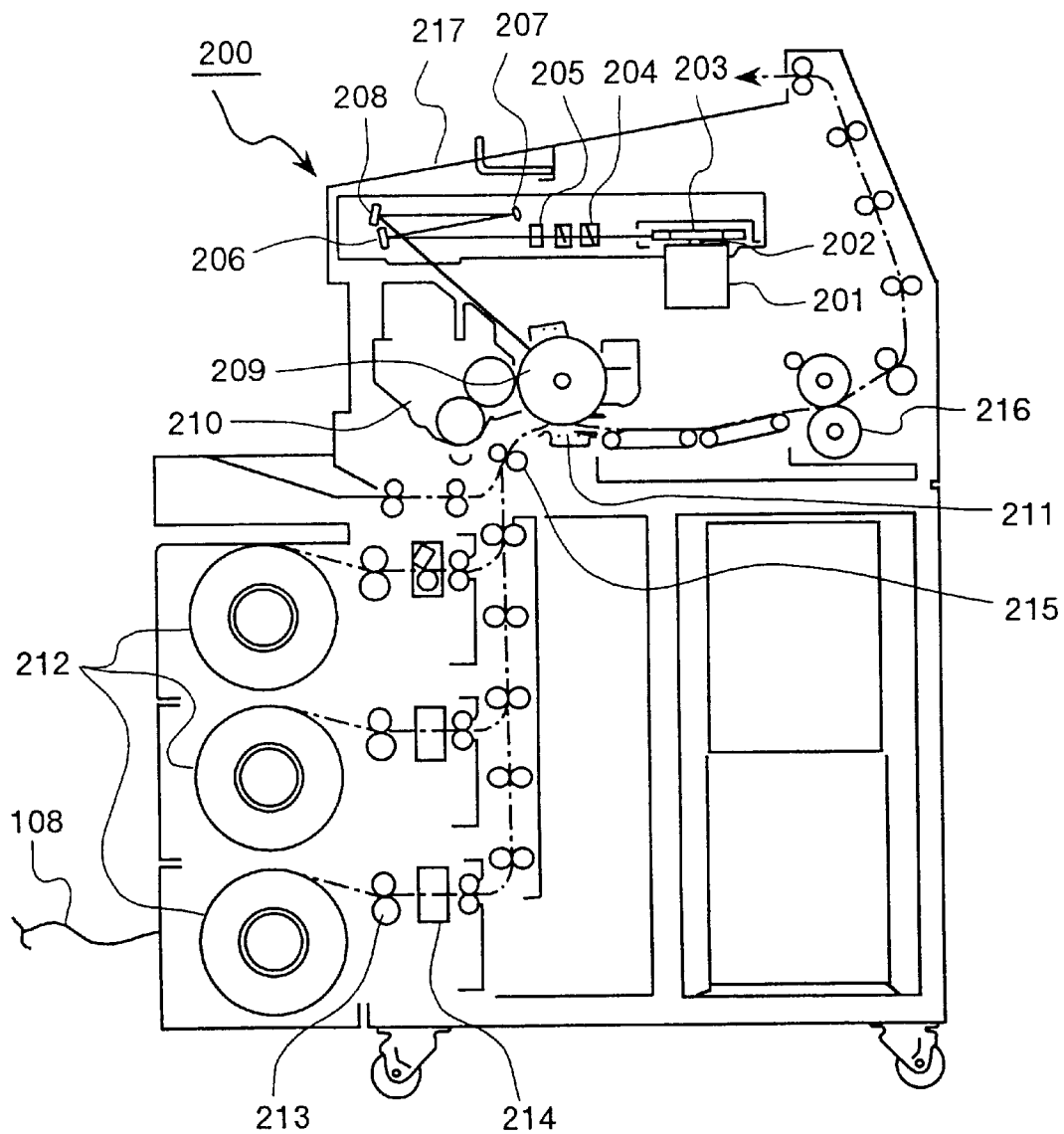
FIG. 2 is a diagram showing the constitution of an image forming apparatus constituting the digital synthesizer according to Embodiment 1 of the present invention.

FIG. 2 shows the constitution of the image forming apparatus constituting the digital synthesizer according to Embodiment 1. The image forming apparatus 200 shown in FIG. 2 comprises a polygon mirror 203 connected to and rotated by a rotating shaft 202 for reflecting a laser beam (a write beam) from a laser diode (Refer to FIG. 3) and scanning a photosensitive drum; a photosensitive drum 209 onto which a laser beam having passed through a cylindrical lens 204 and a f-θ lens 205 and reflected by a first mirror 206, a second mirror 207, and a third mirror 208 respectively for forming an electrostatic latent image thereon, a developing unit 210 for developing the electrostatic latent image formed on the photosensitive drum 209 and forming a toner image on a surface of the photosensitive drum 209, and an electrifier 211 for transferring the toner image formed by the developing unit 210 onto recording paper.

The image forming apparatus 200 further comprises a feed-out roller 213 for feeding the recording paper from a paper feed tray 212, a cutter 214 for cutting the recording paper fed out from the feed-out roller 213 to a desired size, a resist roller 215 for transporting the recording paper cut by the cutter 214 to a section between the photosensitive drum 209 and the electrifier 211 for transfer, a thermal fixing unit for fixing the toner image formed by the electrifier 211 onto the recording paper, and a discharge tray 217 into which the recording paper with an image formed thereon is discharged.

Figure 3:
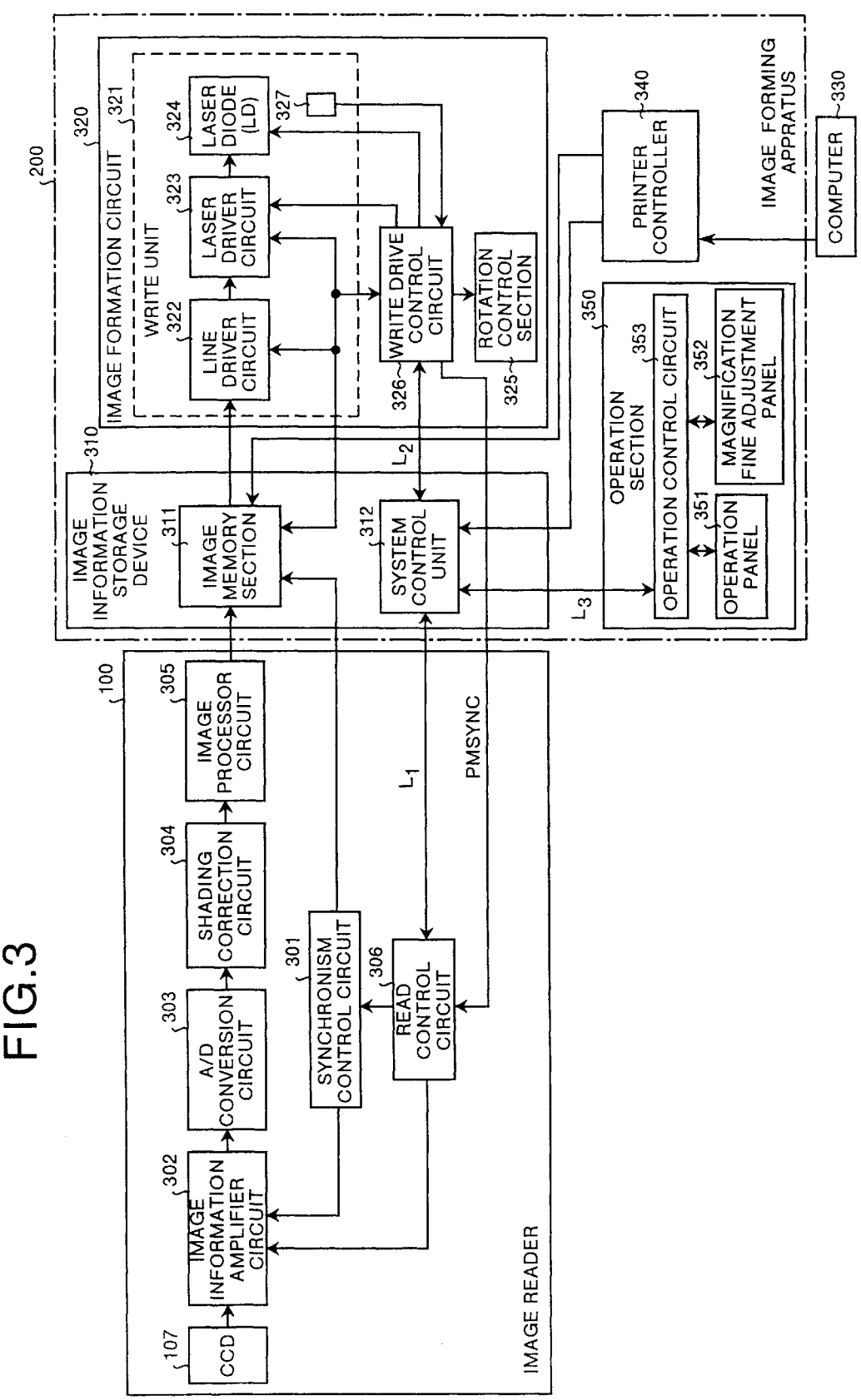
FIG. 3 is a block diagram showing the image reader and image forming apparatus shown in FIG. 1 and FIG. 2, respectively.

FIG. 3 is a block diagram showing a digital synthesizer comprising the image reader 100 and image forming apparatus 200 showing in FIG. 1 and FIG. 2, respectively. In FIG. 3, the image reader 100 comprises an image information amplifier circuit 302 for receiving an analog image signal for a document image from a CCD 107 in synchronism to a clock inputted from a synchronism control circuit 301, an A/D conversion circuit 303 for receiving the image signal amplified by the image information amplifier circuit 302 and converting the image signal to digital image data, a shading correction circuit 304 for receiving image data converted by the A/D conversion circuit 303 and correcting distortion of the received image data, an image processor circuit 305 for subjecting the corrected image data from the shading correction circuit 304 and inputting the processed image data into the image forming apparatus 200, and a reading control circuit 306 for controlling operations for reading of the document image by the image reader 100.

The image forming apparatus 200 shown in FIG. 3 comprises an image memory section 311 for receiving and storing therein image data from the image reader 100 and also for receiving and storing therein image data from a printer controller 340 described later, an image formation circuit 320 for executing a series of processes for forming an image on a recording paper using the image data stored in the image memory section 311, a printer controller 340 with a computer 330 such as a personal computer or a work station connected thereto for converting data generated by the computer 330 to image data with a bit-map format, a system control unit 312 for controlling each of the image reader 100 and image forming apparatus 200 to select and output image data inputted from the image reader 100 as well as image data inputted from the printer controller 340, and an operation section 350 for inputting various types of commands into the system control unit 312 to operate the image reader 100 and image forming apparatus 200. It should be noted that the image memory section 311 and system control unit 312 form an image information storage device 310.

In FIG. 3, the image formation circuit 320 comprises a write unit 321 having a line driver circuit 322 for receiving image data from the image memory section 311 and amplifying the received image data, a write unit 321 having a laser driver circuit 323 for receiving the image data amplified by the line driver circuit 322 and driving a laser diode (LD) 324 according to the write reference clock, a rotation control section 325 for driving the polygon motor 201 according to a drive clock, and a write drive control circuit 326 for generating a write reference clock as well as a drive clock and also for controlling each section constituting the image formation circuit 320. It should be noted that, in FIG. 3, the reference numeral 327 indicates a synchronism detecting sensor.

Figure 4:
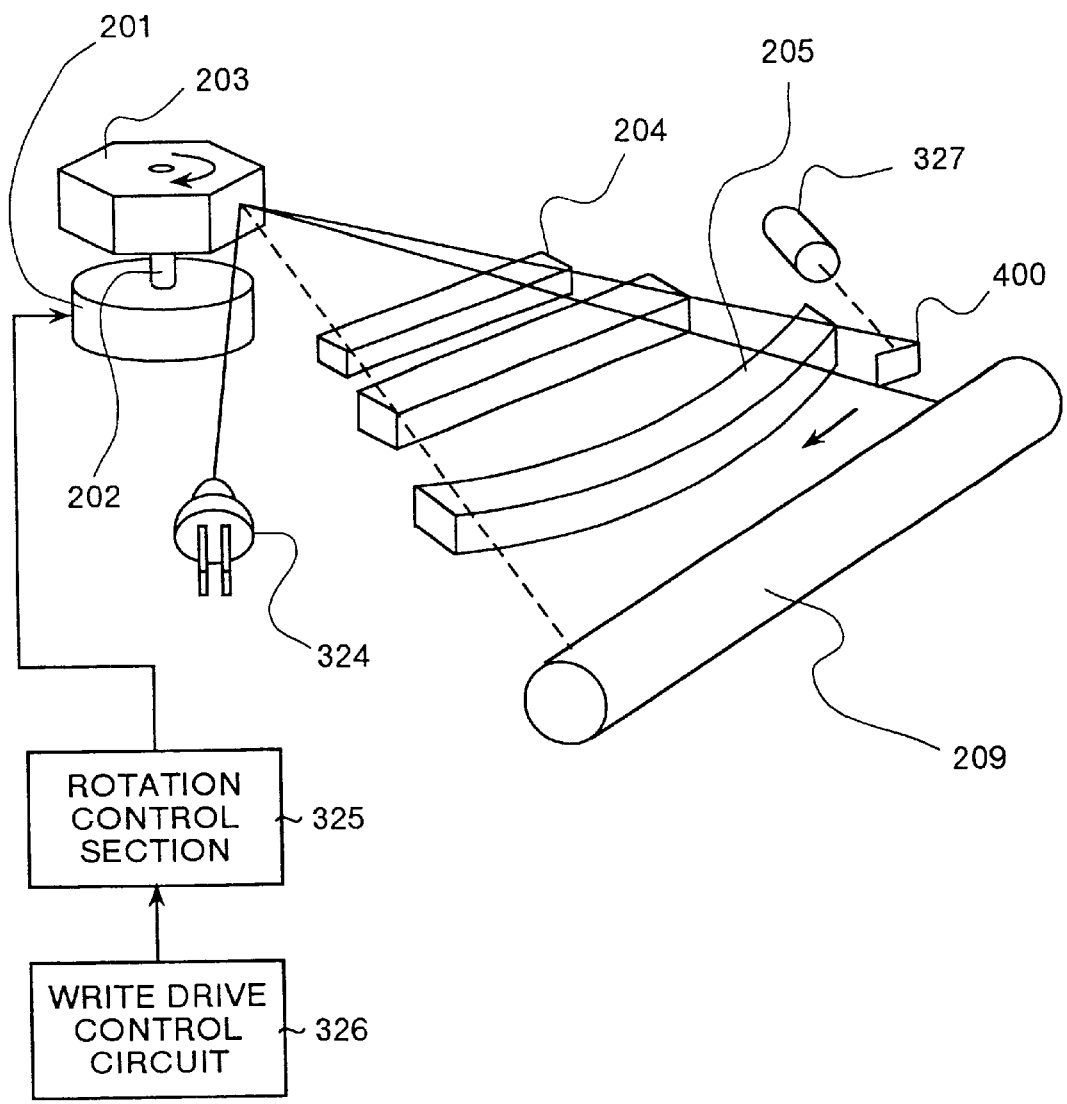
FIG. 4 shows the constitution of an optical system for data write in the digital synthesizer according to Embodiment 1 of the present invention.

FIG. 4 shows the constitution of an optical writing unit of the digital synthesizer according to Embodiment 1. The write drive control circuit 326 generates a drive clock with a frequency of, for instance, 1049.868 Hz and controls the rotation control section 325 so that the polygon mirror 203 having six faces rotates at 31496 rpm. The rotation control section 325 drives the polygon motor 201 and rotates the polygon mirror 203 according to the drive clock generated in the write drive control circuit 326. It should be noted that the write drive control circuit 326 is adapted for making the drive clock change by 0.1% step within a range of ±2% under control by the system control unit 312 described later.

In FIG. 4, a laser beam emitted from the LD 324 according to image data is converted to a parallel beam by a collimate lens not shown herein, and is irradiated onto the polygon mirror 203. The laser beam reflected by the polygon mirror 203 is at first reflected by a mirror for synchronism detection 400 and then introduced into a synchronism detection sensor 327.

The synchronism detection sensor 327 detects a rotational angle or a rotation cycle of the polygon mirror 203, generates a PMSYNC signal (synchronism control signal) used for establishing synchronism between a write start position in the main scanning direction and read timing by the CCD 107, and inputs the PMSYNC signal into the write drive control circuit 326. The write drive control circuit 326 decides timing for writing according to the PMSYNC signal generated in the synchronism detection sensor 327. Namely, the write drive control circuit 326 generates a write reference clock for modulating a laser beam from the LD 324 to obtain a specified pixel density according to the PMSYNC signal. As a frequency of this write reference clock, for instance, 33 MHz is used, and the clock is generated in a PLL circuit (not shown) in the write drive control circuit 326. The write drive control circuit 326 is adapted for changing the write reference clock by 0.1% step within a range of ±2% under control by the system control unit 312 described later. Herein, when the write reference clock changes, the write start position changes, so that the write drive control circuit 326 controls the write start position such that an image is always written at the center of the photosensitive drum 209.

It should be noted that the read control circuit 306 shown in FIG. 3 receives a PMSYNC signal from the write drive control circuit 326 and controls the processing for reading an image of a document in synchronism to the timing for writing image data. Namely, the read control circuit 306 generates a drive clock according to the PMSYNC signal to control the motor 104 for transporting a document. It should be noted that the read control circuit 306 is adapted for changing a rotational speed of the motor 104 by changing a drive clock for the motor 104 by 0.1% step within a range of ±2% under control by the system control unit 312 described later.

The operation section 350 shown in FIG. 3 comprises an operation panel 351 for inputting various types of instruction with key operations and a touch panel, and has a magnification fine adjustment panel for finely adjusting a magnification to obtain print output and copy output with a small magnification error and an operation control circuit 353 for inputting the signal corresponding to a key operation executed on the operation panel 351 and the magnification fine adjustment panel 352 into the system control unit 312.

Figure 5:
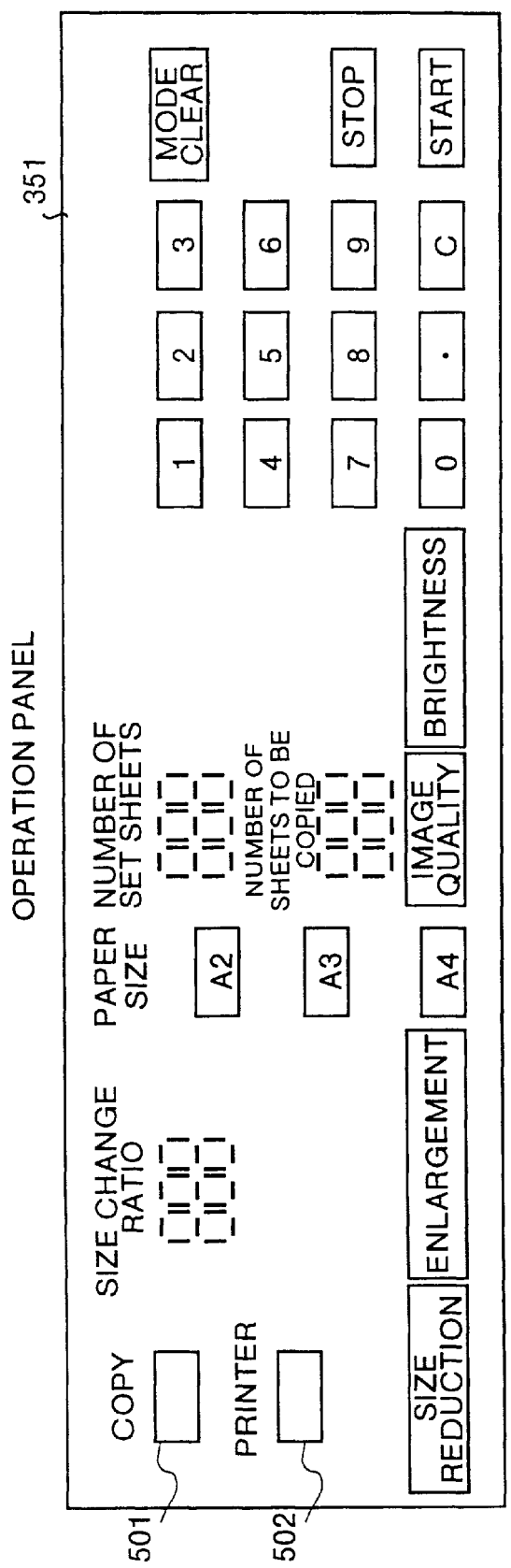
FIG. 5 shows an operation panel provided in the digital synthesizer according to Embodiment 1 of the present invention.

FIG. 5 shows the operation panel 351 in detail. As shown in FIG. 5, keys are provided on the operation panel 351 for specifying various functions such as mode clear, stop, start, ten-keys, brightness adjustment, image quality adjustment, paper size, size reduction or enlargement, a character display unit for displaying thereon a number of set sheets, a number of copies to be printed, a magnification, or the like. Furthermore, provided on the operation panel 351 are a copy mode button for specifying the copy mode and a printer mode button for specifying the printer mode.

FIG. 6 is a view showing configuration of the magnification fine adjustment panel 352. FIG. 6 shows a state in the copy mode as an example. The magnification fine adjustment panel 352 has a touch panel provided on the LCD. On this magnification fine adjustment panel 352, by operating the "+" key and "−" key, it is possible to set a value for fine adjustment of a magnification by 0.1% step within a range from +1.0% to −1.0% (described as a magnification fine adjustment value hereinafter). It should be noted that, in the magnification fine adjustment panel 352 shown in FIG. 6, a magnification fine adjustment value in the "vertical" direction indicates a value for finely adjusting a magnification in the auxiliary direction (described as "auxiliary scanning magnification fine adjustment value" herein after), and a magnification fine adjustment value in the "horizontal" direction indicates a fine adjustment value for a magnification in the main scanning direction (described "main scanning magnification fine adjustment value").

Figure 7:
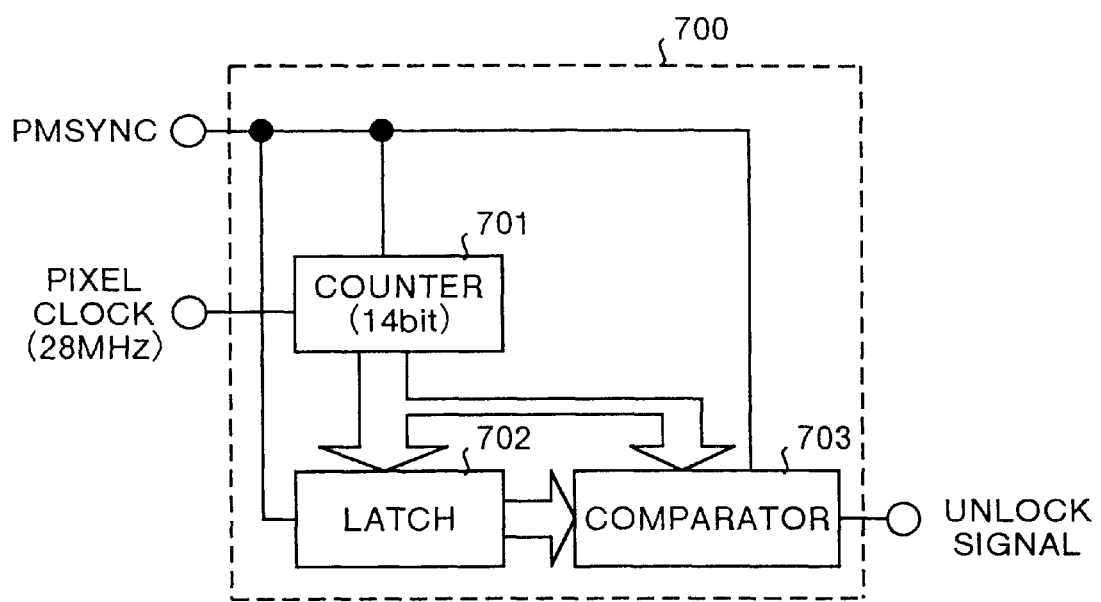
FIG. 7 is a block diagram showing a counter circuit constituting a portion of a write drive control circuit in the digital synthesizer according to Embodiment 1 of the present invention.

FIG. 7 is a block diagram showing configuration of a counter circuit 700 constituting a portion of the write drive control circuit 326. The counter circuit 700 is used to determine whether the polygon mirror 203 is rotating stably or not. This counter circuit 700 comprises a counter 701 for receiving pixel clocks each with a frequency of 28 MHz and for counting the received pixel clocks, a latch 702 for receiving a PMSYNC signal generated by the synchronism detection sensor 327 and latching a count value by the counter 701 in synchronism to the received PMSYNC signal, and a comparator 703 for comparing a count value by the counter 701 to a previous count value latched in the latch 702 and indicating, when a difference between the two values is not less than a preset value, that rotation of the polygon mirror 203 is unstable.

An unlock signal outputted from the comparator 703 is inputted into the system control device 312 described later and is used to determine whether the polygon motor 201 is stably rotating or not when the operation mode is switched from the copy mode to the printer mode or from the printer mode to the copy mode.

Returning again to FIG. 3, the system control unit 312 comprises, for instance, a microprocessor (described as CPU hereinafter) as a main component, and has a ROM, a RAM, a clock signal generating circuit, a timer and an interruption control for interruption processing or the like. In addition, the system control unit 312 has an I/O and serial communication controller for communications among the image reader 100, image information storage device 310, image formation circuit 320, and operation section 350.

This system control unit 312 receives a magnification fine adjustment value set on the magnification fine adjustment panel 352 shown in FIG. 6, changes a write reference clock frequency by controlling the write drive control unit 326, when the operation mode is the copy mode, according to the received magnification fine adjustment value, and also changes a rotational speed of the motor 104 for transporting a document by controlling the read control circuit 306 to control the processing for finely adjusting the magnification. On the other hand, when the operation mode is the printer mode, the system control unit 312 controls the processing for finely adjusting a magnification by changing a write reference clock frequency and a rotational speed of the polygon mirror 203 by way of controlling the write drive control circuit 326. In addition, the system control unit 312 determines, as described below, whether the polygon mirror 203 is stably rotating or not according to the unlock signal from the counter circuit 700 shown in FIG. 7, and controls the processing for switching the operation mode from the copy mode to the printer mode or from the printer mode to the copy mode.

Furthermore, the image memory section 311 has, for instance, three page memories, and any of the page memories is selected according to a memory control signal (not shown) from the system control unit 312 and data write to or data read from the page memory is executed. Data write to or data read from the page memory is executed according to a PMSYNC signal outputted from the synchronism detection sensor 327.

It should be noted that, as shown in FIG. 3, the read control circuit 306, image information storage device 310, image formation circuit 320, and operation section 350 are connected to each other with signal lines L1, L2 and L3 each based on RS422 standard, and serial data transfer is executed through these signal lines.

Next detailed description is made for operations of the digital synthesizer having the configuration as described above according to Embodiment 1 of the present invention in the order of (1) operations in the copy mode, (2) operations in the printer mode and (3) operations during mode switching.

(1) Operations in the Copy Mode

At first, operations when the digital synthesizer according to Embodiment 1 is set in the copy mode are explained. It should be noted that, when the digital synthesizer is set in the copy mode, the copy mode button 501 on the operation panel 351 is turned ON.

When power of the digital synthesizer is turned ON, a CPU in the system control unit 312 clears an I/O interface or a RAM to an initial state. Then a state monitor flag is set and the state for waiting for reception of an instruction from the operation section 350 is effected. Then a user inserts a document in the image reader 100, sets the number of copies and other conditions on the operation panel 351, and gives an instruction for starting the copying operation, then the copy processing is started under the conditions set on the operation panel 351.

User can input a magnification adjustment value for fine adjustment of a magnification according to a type of paper used as recording paper by way of operating the magnification fine adjustment panel 352 shown in FIG. 6. Specifically, the user can independently set an auxiliary scan magnification fine adjustment value as a reference for fine adjustment of a magnification of an image in the auxiliary scan direction and a main scanning magnification fine adjustment value as a reference for fine adjustment of magnification of an image in the main scanning direction by 0.1% step within a range from +1.0% to −1.0% respectively.

When start of the copying operation is instructed from the operation panel 351, the operation control circuit 353 inputs a magnification fine adjustment value inputted from the magnification fine adjustment panel 352 into the system control unit 312. A magnification fine adjustment value inputted into the system control unit 312 is stored as appended data for the copying mode and each section is controlled in the copying mode according to the magnification fine adjustment value. In other words, so long as a user does not set a new magnification fine adjustment value, the processing for reading an image from a document and the processing for forming an image are controlled according to the magnification fine adjustment value previously set.

The system control unit 312 generates a clock generation control data for generating a write reference clock for the LD 324 according to the main scan magnification fine adjustment value of the magnification fine adjustment values described above, and also generates rotational speed control data for changing a rotational speed of the motor 104 for transporting a document according to the auxiliary scan magnification fine adjustment value. The clock generation control data is inputted into the write drive control circuit 326 and the rotational speed control data into the read control circuit 306 respectively.

It should be noted that the clock generation control data and rotational speed control data can easily be computed through an operational expression, and a table with previously-prepared clock generation control data and rotational speed control data each corresponding to a magnification fine adjustment value registered therein may be used like in a case of the printer mode described below.

According to an instruction for starting the copying operation, the motor 104 for transporting a document is driven, and the document is transported in the auxiliary scanning direction between the contact glass 102 and reflection plate 103 according to rotation of the rollers 101. During transportation of this document, the document is scanned in the main scanning direction by a beam from the light source 105.

The read control circuit 306 can change a rotational speed of the motor for transporting a document by 0.1 step within a range of ±2%. When the user sets a magnification fine adjustment value (auxiliary scan magnification fine adjustment value) by operating the magnification fine adjustment panel 352, the read control section 306 inputs rotational speed control data according to a magnification fine adjustment value from the system control unit 312, and changes a rotational speed of the motor 104 according to the inputted rotational speed control data. As a result, a magnification in the auxiliary scanning direction can finely be adjusted according to the magnification fine adjustment value specified by the user.

A reflected beam reflected by the document, namely an image of the document is formed via the lens 106 on the CCD 107, and the formed document image is read by the CCD 107. The CCD 107 is driven according to a PMSYNC signal outputted from the write drive control circuit 326 in synchronism to a rotational angle or a rotation cycle of the polygon mirror 203. It should be noted that the PMSYNC signal is generated in the synchronism detection sensor 327.

The document image read by the CCD 107 is inputted as an analog image signal into the image information amplifier circuit 302 in synchronism to a clock generated in the synchronism control circuit 301. The image signal amplified in the image information amplifier circuit 302 is inputted into the A/D conversion circuit 303 and is converted to multi-valued digital image data there. The image data converted in the A/D conversion circuit 303 is inputted into the shading correction circuit 304, and the processing for removing distortion due to lowering of a light quantity in the peripheral area by a lens, non-uniformity in a light quantity, contamination of the contact glass 102, non-uniformity of sensibility of the CCD 107 or for some other reasons is executed in the shading correction circuit 304.

The image data is inputted into the image processor circuit 305, where the image data is subjected to MTF correction, γ-conversion, filtering, main scan size change processing by 1% and then stored in the image memory section 311.

The image memory section 311 has a memory capacity sufficient for storing therein image data for up to A2 size generated by reading a document image with the image reader 100. It should be noted that, when a plurality sheets of copy are to be prepared, image formation for a second sheet and on is executed by using the image data stored in the image memory section 311.

The image data stored in the image memory section 311 is read out by the line driver circuit 322 comprising a toggle buffer and amplified therein. Image data is a multi-valued signal of 8 bits per one pixel, and the laser driver circuit 323 generates a laser beam by modulating the LD 324 according to a multi-valued signal.

A laser beam from the LD 324 is reflected by the polygon mirror 203, passes through the cylindrical lens 204 and f-θ lens 205, is reflected by the first mirror 206, second mirror 207, and third mirror 208, and then an image is formed on the photosensitive drum 209.

As shown in FIG. 4, the polygon mirror 203 is attached via a rotational shaft 202 to the polygon motor 201, and the polygon motor 201 rotates at a constant speed under control by the rotation control section 325 and rotates the polygon mirror 203 at a constant speed (Rotational speed: 31496 rpm). In association with rotation of the polygon mirror 203, a laser beam from the LD 324 is scanned in a direction perpendicular to a rotational direction of the photosensitive drum 209, namely in a direction along the drum shaft.

The write drive control circuit 326 generates a drive clock with a frequency of 1049.869 Hz to provide controls so that the polygon mirror rotates at 31496 rmp. In addition, the write drive control circuit 326 receives a PMSYNC signal generated by the synchronism detection sensor 327 and decides write timing by the LD 324. Furthermore, the write drive control circuit 326 generates a write reference clock with a frequency of 33 Mhz with a PLL circuit in the circuit.

As described above, the write drive control circuit 326 can change the write reference clock by 0.1 step within a range of ±2%. When a user operates the magnification fine adjustment panel 352 to specify a magnification fine adjustment value (main scan magnification fine adjustment value), the write drive control circuit 326 receives clock generation control data corresponding to the magnification fine adjustment value from the system control unit 312 and changes a write reference clock frequency according to the received clock generation control data. As a result, a magnification in the main scanning direction can finely be adjusted according to the magnification fine adjustment value specified by the user.

Namely, it is possible to correct an error in the magnification in the auxiliary scanning direction due to slipping of a paper being transported by changing a rotational speed of the motor 104 for transporting a document and also to correct an error in the magnification in the main scanning direction by changing a write reference clock frequency generated by the LD 324.

It should be noted that, slipping of a paper during transfer can be compensated by a document transfer speed in the image reader 100 due to the following reasons. A PMSYNC signal generated by each surface of the polygon mirror 203 in association with rotation thereof controls both operations for reading a document and writing an image, and even if this PMSYNC signal is changed, only the read density and write density are changed, but the magnification is not changed. Therefore, the rotational speed of the polygon mirror 203 is fixed at a design value of 31496 rpm. Calibration for magnification in the auxiliary scanning direction is executed so that the magnification error will be 0.3% or less for the same document and paper, but a degree of shrinkage of papers used by a user varies when an image is fixed according to various environmental conditions, and the magnification error can be made smaller by adjusting a magnification in the auxiliary scanning direction by way of changing a rotational speed of the motor 104 for transporting a document.

Surface of the photosensitive drum 209 is uniformly electrified by the electrifier connected to a negative high voltage generator, and when a laser beam emitted according to image data is irradiated onto a surface of the photosensitive drum 209, an electric charge on the surface flows to a grounding line for the photosensitive drum 209 and extinguished due to the optoelectric conduction phenomenon. In this step, by irradiating a weak laser beam to a section of the document which is pale and a strong laser beam to a section of the document which is dark, an electric potential on a surface of the photosensitive drum 209 becomes −500V in the pale section and −100V to −150V in the dark section, and an electrostatic latent image is formed on the photosensitive drum 209 in correspondence to gradation of the document.

The electrostatic latent image formed on the photosensitive drum 209 is developed by the developing unit 210 and a toner image is formed on a surface of the photosensitive drum 209. It should be noted that toner in the developing unit 210 is electrified to a positive level during agitation, and the developing unit 210 is biased to around −500V by a development bias generator, so that the positively charged toner is deposited on a place where the surface potential of the photosensitive drum 209 is higher than the development bias and a toner image corresponding to the document image is formed.

Of the three units of paper feed trays 212, recording paper is fed out by the feed roller 213 from the selected paper feed tray 212, and is cut to a specified size by the cutter 214. Then the recording paper is transported by the resist roller 215 to a section at a specified timing between the photosensitive drum 209 and electrifier 211 for transfer, and a toner image is formed on the recording paper by the electrifier 211 for transfer.

The recording paper with a toner image formed thereon is transported to the thermally fixing unit 216 where toner is fixed on the recording paper and then the recording paper is discharged into the discharge tray 217.

An image of the document formed on the recording paper discharged into the discharge tray 217 has a magnification adjusted according to a magnification fine adjustment value specified by a user on the magnification fine adjustment panel 352.

(2) Operations in the Printer Mode

Operations in a case where the digital synthesizer according to Embodiment 1 of the present invention is set in the printer mode are described. It should be noted that, when the digital synthesizer is set in the printer mode, the printer mode button 502 on the operation panel 351 is light.

A user inputs a magnification fine adjustment value for fine adjustment of a magnification according to a type or size of a paper used as a recording paper. It should be noted that two different display screens of the magnification fine adjustment are prepared for the copy mode and printer mode respectively, but the displays provided on each screen are identical. Namely a user can independently set an auxiliary scan magnification fine adjustment value as a reference for fine adjustment of a magnification in the auxiliary scanning direction and a main scan magnification fine adjustment value for fine adjustment of a magnification in the main scanning direction respectively by 0.1% step within a range from +1.0 to −1.0%.

In the printer mode, a printer controller 340 converts arbitrary data inputted from a computer 330 to image data with a bit-map format, and then stores the converted image data in the image memory section 311. Image data transfer to the image memory section 311 is controlled by the system control unit 312.

It should be noted that the processing for storing image data in the image memory section 311 and then forming an image on recording paper based on the image data is the same as that described in relation to the copy mode, therefore, description is made hereinafter for only the processing for fine adjustment of a magnification.

The magnification fine adjustment value specified through the magnification fine adjustment panel 352 is inputted from the operation control circuit 353 into the system control unit 312, for instance, when an instruction for printing is inputted from the computer 330.

The system control unit 312 selects a polygon motor rotational speed set value and a write clock frequency set value each corresponding to the inputted magnification fine adjustment value from the magnification correction table shown in Table 1 and Table 2 and inputs the values into the write drive control circuit 326. It is possible to save the magnification correction table in the image memory section 311.

TABLE 1

| | | \multicolumn{11}{c}{MAIN SCANNING DIRECTION} |
|---|---|---|---|---|---|---|---|---|---|---|---|---|
| | | 1.0 | 0.9 | 0.8 | 0.7 | 0.6 | 0.5 | 0.4 | 0.3 | 0.2 | 0.1 | 0 |
| AUXILIARY SCANNING DIRECTION | 1.0 | −1.0 | −1.0 | −1.0 | −1.0 | −1.0 | −1.0 | −1.0 | −1.0 | −1.0 | −1.0 | −1.0 |
| | | 2.0 | 1.9 | 1.8 | 1.7 | 1.6 | 1.5 | 1.4 | 1.3 | 1.2 | 1.1 | 1.0 |
| | 0.9 | −0.9 | −0.9 | −0.9 | −0.9 | −0.9 | −0.9 | −0.9 | −0.9 | −0.9 | −0.9 | −0.9 |
| | | 1.9 | 1.8 | 1.7 | 1.6 | 1.5 | 1.4 | 1.3 | 1.2 | 1.1 | 1.0 | 0.9 |
| | 0.8 | −0.8 | −0.8 | −0.8 | −0.8 | −0.8 | −0.8 | −0.8 | −0.8 | −0.8 | −0.8 | −0.8 |
| | | 1.8 | 1.7 | 1.6 | 1.5 | 1.4 | 1.3 | 1.2 | 1.1 | 1.0 | 0.9 | 0.8 |
| | 0.7 | −0.7 | −0.7 | −0.7 | −0.7 | −0.7 | −0.7 | −0.7 | −0.7 | −0.7 | −0.7 | −0.7 |
| | | 1.7 | 1.6 | 1.5 | 1.4 | 1.3 | 1.2 | 1.1 | 1.0 | 0.9 | 0.8 | 0.7 |
| | 0.6 | −0.6 | −0.6 | −0.6 | −0.6 | −0.6 | −0.6 | −0.6 | −0.6 | −0.6 | −0.6 | −0.6 |
| | | 1.6 | 1.5 | 1.4 | 1.3 | 1.2 | 1.1 | 1.0 | 0.9 | 0.8 | 0.7 | 0.6 |
| | 0.5 | −0.5 | −0.5 | −0.5 | −0.5 | −0.5 | −0.5 | −0.5 | −0.5 | −0.5 | −0.5 | −0.5 |
| | | 1.5 | 1.4 | 1.3 | 1.2 | 1.1 | 1.0 | 0.9 | 0.8 | 0.7 | 0.6 | 0.5 |
| | 0.4 | −0.4 | −0.4 | −0.4 | −0.4 | −0.4 | −0.4 | −0.4 | −0.4 | −0.4 | −0.4 | −0.4 |
| | | 1.4 | 1.3 | 1.2 | 1.1 | 1.0 | 0.9 | 0.8 | 0.7 | 0.6 | 0.5 | 0.4 |
| | 0.3 | −0.3 | −0.3 | −0.3 | −0.3 | −0.3 | −0.3 | −0.3 | −0.3 | −0.3 | −0.3 | −0.3 |
| | | 1.3 | 1.2 | 1.1 | 1.0 | 0.9 | 0.8 | 0.7 | 0.6 | 0.5 | 0.4 | 0.3 |
| | 0.2 | −0.2 | −0.2 | −0.2 | −0.2 | −0.2 | −0.2 | −0.2 | −0.2 | −0.2 | −0.2 | −0.2 |
| | | 1.2 | 1.1 | 1.0 | 0.9 | 0.8 | 0.7 | 0.6 | 0.5 | 0.4 | 0.3 | 0.2 |
| | 0.1 | −0.1 | −0.1 | −0.1 | −0.1 | −0.1 | −0.1 | −0.1 | −0.1 | −0.1 | −0.1 | −0.1 |
| | | 1.1 | 1.0 | 0.9 | 0.8 | 0.7 | 0.6 | 0.5 | 0.4 | 0.3 | 0.2 | 0.1 |
| | 0 | 0 | 0 | 0 | 0 | 0 | 0 | 0 | 0 | 0 | 0 | 0 |
| | | 1.0 | 0.9 | 0.8 | 0.7 | 0.6 | 0.5 | 0.4 | 0.3 | 0.2 | 0.1 | 0 |

| | | \multicolumn{10}{c}{MAIN SCANNING DIRECTION} |
|---|---|---|---|---|---|---|---|---|---|---|---|
| | | −0.1 | −0.2 | −0.3 | −0.4 | −0.5 | −0.6 | −0.7 | −0.8 | −0.9 | −1.0 |
| AUXILIARY SCANNING DIRECTION | 1.0 | −1.0 | −1.0 | −1.0 | −1.0 | −1.0 | −1.0 | −1.0 | −1.0 | −1.0 | −1.0 |
| | | 0.9 | 0.8 | 0.7 | 0.6 | 0.5 | 0.4 | 0.3 | 0.2 | 0.1 | 0 |
| | 0.9 | −0.9 | −0.9 | −0.9 | −0.9 | −0.9 | −0.9 | −0.9 | −0.9 | −0.9 | −0.9 |
| | | 0.8 | 0.7 | 0.6 | 0.5 | 0.4 | 0.3 | 0.2 | 0.1 | 0 | −0.1 |
| | 0.8 | −0.8 | −0.8 | −0.8 | −0.8 | −0.8 | −0.8 | −0.8 | −0.8 | −0.8 | −0.8 |
| | | 0.7 | 0.6 | 0.5 | 0.4 | 0.3 | 0.2 | 0.1 | 0 | −0.1 | −0.2 |
| | 0.7 | −0.7 | −0.7 | −0.7 | −0.7 | −0.7 | −0.7 | −0.7 | −0.7 | −0.7 | −0.7 |
| | | 0.6 | 0.5 | 0.4 | 0.3 | 0.2 | 0.1 | 0 | −0.1 | −0.2 | −0.3 |
| | 0.6 | −0.6 | −0.6 | −0.6 | −0.6 | −0.6 | −0.6 | −0.6 | −0.6 | −0.6 | −0.6 |
| | | 0.5 | 0.4 | 0.3 | 0.2 | 0.1 | 0 | −0.1 | −0.2 | −0.3 | −0.4 |
| | 0.5 | −0.5 | −0.5 | −0.5 | −0.5 | −0.5 | −0.5 | −0.5 | −0.5 | −0.5 | −0.5 |
| | | 0.4 | 0.3 | 0.2 | 0.1 | 0 | −0.1 | −0.2 | −0.3 | −0.4 | −0.5 |
| | 0.4 | −0.4 | −0.4 | −0.4 | −0.4 | −0.4 | −0.4 | −0.4 | −0.4 | −0.4 | −0.4 |
| | | 0.3 | 0.2 | 0.1 | 0 | −0.1 | −0.2 | −0.3 | −0.4 | −0.5 | −0.6 |
| | 0.3 | −0.3 | −0.3 | −0.3 | −0.3 | −0.3 | −0.3 | −0.3 | −0.3 | −0.3 | −0.3 |
| | | 0.2 | 0.1 | 0 | −0.1 | −0.2 | −0.3 | −0.4 | −0.5 | −0.6 | −0.7 |
| | 0.2 | −0.2 | −0.2 | −0.2 | −0.2 | −0.2 | −0.2 | −0.2 | −0.2 | −0.2 | −0.2 |
| | | 0.1 | 0 | −0.1 | −0.2 | −0.3 | −0.4 | −0.5 | −0.6 | −0.7 | −0.8 |
| | 0.1 | −0.1 | −0.1 | −0.1 | −0.1 | −0.1 | −0.1 | −0.1 | −0.1 | −0.1 | −0.1 |
| | | 0 | −0.1 | −0.2 | −0.3 | −0.4 | −0.5 | −0.6 | −0.7 | −0.8 | −0.9 |
| | 0 | 0 | 0 | 0 | 0 | 0 | 0 | 0 | 0 | 0 | 0 |
| | | −0.1 | −0.2 | −0.3 | −0.4 | −0.5 | −0.6 | −0.7 | −0.8 | −0.9 | −1.0 |

UPPER ROW: ROTATION SPEED OF A POLYGON MOTOR
LOWER ROW: WRITE CLOCK REFERENCE FREQUENCY SET VALUE

TABLE 2

| | | \multicolumn{11}{c}{MAIN SCANNING DIRECTION} |
|---|---|---|---|---|---|---|---|---|---|---|---|---|
| | | 1.0 | 0.9 | 0.8 | 0.7 | 0.6 | 0.5 | 0.4 | 0.3 | 0.2 | 0.1 | 0 |
| AUXILIARY SCANNING DIRECTION | −0.1 | 0.1 | 0.1 | 0.1 | 0.1 | 0.1 | 0.1 | 0.1 | 0.1 | 0.1 | 0.1 | 0.1 |
| | | 0.9 | 0.8 | 0.7 | 0.6 | 0.5 | 0.4 | 0.3 | 0.2 | 0.1 | 0 | −0.1 |
| | −0.2 | 0.2 | 0.2 | 0.2 | 0.2 | 0.2 | 0.2 | 0.2 | 0.2 | 0.2 | 0.2 | 0.2 |
| | | 0.8 | 0.7 | 0.6 | 0.5 | 0.4 | 0.3 | 0.2 | 0.1 | 0 | −0.1 | −0.2 |
| | −0.3 | 0.3 | 0.3 | 0.3 | 0.3 | 0.3 | 0.3 | 0.3 | 0.3 | 0.3 | 0.3 | 0.3 |
| | | 0.7 | 0.6 | 0.5 | 0.4 | 0.3 | 0.2 | 0.1 | 0 | −0.1 | −0.2 | −0.3 |
| | −0.4 | 0.4 | 0.4 | 0.4 | 0.4 | 0.4 | 0.4 | 0.4 | 0.4 | 0.4 | 0.4 | 0.4 |
| | | 0.6 | 0.5 | 0.4 | 0.3 | 0.2 | 0.1 | 0 | −0.1 | −0.2 | −0.3 | −0.4 |
| | −0.5 | 0.5 | 0.5 | 0.5 | 0.5 | 0.5 | 0.5 | 0.5 | 0.5 | 0.5 | 0.5 | 0.5 |
| | | 0.5 | 0.4 | 0.3 | 0.2 | 0.1 | 0 | −0.1 | −0.2 | −0.3 | −0.4 | −0.5 |
| | −0.6 | 0.6 | 0.6 | 0.6 | 0.6 | 0.6 | 0.6 | 0.6 | 0.6 | 0.6 | 0.6 | 0.6 |
| | | 0.4 | 0.3 | 0.2 | 0.1 | 0 | −0.1 | −0.2 | −0.3 | −0.4 | −0.5 | −0.6 |
| | −0.7 | 0.7 | 0.7 | 0.7 | 0.7 | 0.7 | 0.7 | 0.7 | 0.7 | 0.7 | 0.7 | 0.7 |
| | | 0.3 | 0.2 | 0.1 | 0 | −0.1 | −0.2 | −0.3 | −0.4 | −0.5 | −0.6 | −0.7 |
| | −0.8 | 0.8 | 0.8 | 0.8 | 0.8 | 0.8 | 0.8 | 0.8 | 0.8 | 0.8 | 0.8 | 0.8 |
| | | 0.2 | 0.1 | 0 | −0.1 | −0.2 | −0.3 | −0.4 | −0.5 | −0.6 | −0.7 | −0.8 |
| | −0.9 | 0.9 | 0.9 | 0.9 | 0.9 | 0.9 | 0.9 | 0.9 | 0.9 | 0.9 | 0.9 | 0.9 |
| | | 0.1 | 0 | −0.1 | −0.2 | −0.3 | −0.4 | −0.5 | −0.6 | −0.7 | −0.8 | −0.9 |
| | −1.0 | 1.0 | 1.0 | 1.0 | 1.0 | 1.0 | 1.0 | 1.0 | 1.0 | 1.0 | 1.0 | 1.0 |
| | | 0 | −0.1 | −0.2 | −0.3 | −0.4 | −0.5 | −0.6 | −0.7 | −0.8 | −0.9 | −1.0 |

| | | \multicolumn{10}{c}{MAIN SCANNING DIRECTION} |
|---|---|---|---|---|---|---|---|---|---|---|---|
| | | −0.1 | −0.2 | −0.3 | −0.4 | −0.5 | −0.6 | −0.7 | −0.8 | −0.9 | −1.0 |
| AUXILIARY SCANNING DIRECTION | −0.1 | 0.1 | 0.1 | 0.1 | 0.1 | 0.1 | 0.1 | 0.1 | 0.1 | 0.1 | 0.1 |
| | | −0.2 | −0.3 | −0.4 | −0.5 | −0.6 | −0.7 | −0.8 | −0.9 | −1.0 | −1.1 |
| | −0.2 | 0.2 | 0.2 | 0.2 | 0.2 | 0.2 | 0.2 | 0.2 | 0.2 | 0.2 | 0.2 |
| | | −0.3 | −0.4 | −0.5 | −0.6 | −0.7 | −0.8 | −0.9 | −1.0 | −1.1 | −1.2 |
| | −0.3 | 0.3 | 0.3 | 0.3 | 0.3 | 0.3 | 0.3 | 0.3 | 0.3 | 0.3 | 0.3 |
| | | −0.4 | −0.5 | −0.6 | −0.7 | −0.8 | −0.9 | −1.0 | −1.1 | −1.2 | −1.3 |
| | −0.4 | 0.4 | 0.4 | 0.4 | 0.4 | 0.4 | 0.4 | 0.4 | 0.4 | 0.4 | 0.4 |
| | | −0.5 | −0.6 | −0.7 | −0.8 | −0.9 | −1.0 | −1.1 | −1.2 | −1.3 | −1.4 |
| | −0.5 | 0.5 | 0.5 | 0.5 | 0.5 | 0.5 | 0.5 | 0.5 | 0.5 | 0.5 | 0.5 |
| | | −0.6 | −0.7 | −0.8 | −0.9 | −1.0 | −1.1 | −1.2 | −1.3 | −1.4 | −1.5 |
| | −0.6 | 0.6 | 0.6 | 0.6 | 0.6 | 0.6 | 0.6 | 0.6 | 0.6 | 0.6 | 0.6 |
| | | −0.7 | −0.8 | −0.9 | −1.0 | −1.1 | −1.2 | −1.3 | −1.4 | −1.5 | −1.6 |
| | −0.7 | 0.7 | 0.7 | 0.7 | 0.7 | 0.7 | 0.7 | 0.7 | 0.7 | 0.7 | 0.7 |
| | | −0.8 | −0.9 | −1.0 | −1.1 | −1.2 | −1.3 | −1.4 | −1.5 | −1.6 | −1.7 |
| | −0.8 | 0.8 | 0.8 | 0.8 | 0.8 | 0.8 | 0.8 | 0.8 | 0.8 | 0.8 | 0.8 |
| | | −0.9 | −1.0 | −1.1 | −1.2 | −1.3 | −1.4 | −1.5 | −1.6 | −1.7 | −1.8 |
| | −0.9 | 0.9 | 0.9 | 0.9 | 0.9 | 0.9 | 0.9 | 0.9 | 0.9 | 0.9 | 0.9 |
| | | −1.0 | −1.1 | −1.2 | −1.3 | −1.4 | −1.5 | −1.6 | −1.7 | −1.8 | −1.9 |
| | −1.0 | 1.0 | 1.0 | 1.0 | 1.0 | 1.0 | 1.0 | 1.0 | 1.0 | 1.0 | 1.0 |
| | | −1.1 | −1.2 | −1.3 | −1.4 | −1.5 | −1.6 | −1.7 | −1.8 | −1.9 | −2.0 |

UPPER ROW: ROTATION SPEED OF A POLYGON MOTOR
LOWER ROW: WRITE CLOCK REFERENCE FREQUENCY SET VALUE

In order to finely adjust a magnification of an image in the auxiliary scanning direction, a rotational speed of the polygon motor 201 is adjusted by changing a drive clock given to a rotation control section 325. For instance, when a magnification in the auxiliary scanning direction is finely adjusted by +1.0%, a rotational speed of the polygon motor 201 should be changed by −0.1%. However, when the rotational speed of the polygon mirror is adjusted as described above, a time required for scanning one face of the polygon mirror 203 changes and a magnification in the main scanning direction becomes smaller by 0.1%, therefore, a magnification in the main scanning direction should finely be adjusted again. Thus, when a magnification in the auxiliary scanning direction is adjusted by changing a rotational speed of the polygon mirror 203 (polygon motor 201), it is required to adjust also a magnification in the main scanning direction by changing a write reference clock frequency.

On the other hand, in order to finely adjust a magnification in the main scanning direction, a write reference clock frequency is adjusted. The write reference clock frequency is adjusted also for correcting an error in magnification in the main scanning direction when a magnification scanning direction is adjusted. Values for correcting an error of a magnification in the main scanning direction when a magnification in the auxiliary scanning direction is adjusted are set in the magnification correction table shown in Table 1 and Table 2. Therefore, the system control unit 312 is required only to select a polygon motor rotational speed set value and a write clock frequency set value each correcting to a magnification fine adjustment value specified by the user from the magnification correction table. It is needless to say that a polygon motor rotational speed set value and a write clock frequency set value may be computed each time a magnification fine adjustment value is inputted without using the magnification correction table shown in Table 1 and Table 2.

The magnification fine adjustment value inputted into the system control unit 312 (or the polygon motor rotational speed set value and write clock frequency set value each obtained from the magnification correction table) is stored as appended data for the printer mode, and each section is controlled in the printer mode according to this magnification fine adjustment value. Namely, so long as a user does not set a new magnification fine adjustment value, the processing for forming an image according to a magnification fine adjustment value previously set is executed.

The write drive control circuit 326 adjusts a drive clock for the polygon motor 201 and a write reference clock for the LD 324 according to the polygon motor rotational speed set value and write clock frequency set value each inputted from the system control unit 312 and executes the processing for forming an image on recording paper. As a result, a magnification in the auxiliary scanning direction and that in the main scanning direction can finely be adjusted according to a magnification fine adjustment value specified by a user.

If adjustment is made when shipping from a plant, a result of adjustment can be stored in the image memory section 311. Namely, a write density is adjusted by correcting at first an error in a magnification in the auxiliary scanning direction due to slipping of a from during transport and then adjusting a rotational speed of the polygon motor taking into account shrinkage of a paper when fixed. When an error in magnification in the auxiliary scanning direction is less than 0.3%, the write density is changed by changing the write reference clock frequency so that also an error of a magnification in the main scanning direction is less than 0.3%.

(3) Operations for Switching the Operation Mode

Processing for switching the operation mode between the copy mode and printer mode is described. In the digital synthesizer according to Embodiment 1, during operations in the copy mode, transfer of image data from the computer 330 is inhibited, and during operations in the printer mode, an operation for reading a document by the image reader 100 is inhibited.

Whether the operation mode is to be switched or not is determined by the system control unit 312 at a point of time when all digital data has been written on the photosensitive drum 209 (at a point of when Fgate for data write is closed). The default is the copy mode, and in a case where all of desired copies are obtained with the next document not having been inserted into the image reader 100 and further any key on the operation panel 351 has not been pressed, if a request for printing is issued from the computer 330, the copy mode is inhibited, and the operation mode shifts to the printer mode.

When the operation mode shifts to the printer mode, the state shown in FIG. 5 where the printer mode button 502 has been turned ON is effected, so that the current mode can easily be maintained. In addition, when the operation mode shifts to the printer mode, controls are provided by the operation control circuit 353 so that a user can not press a key on the operation panel 351 to operate the digital synthesizer. When the digital synthesizer is operating in the printer mode, shift to the copy mode is inhibited, but if the copy mode button 501 is pressed down at a point of time when transfer of image data from the computer 330 is finished or before the point of time, the operation mode shifts to the copy mode at a point of time when transfer of image data from the computer 330 is finished (Egate closed).

When fine adjustment of a magnification is executed in the printer mode, as described above, a write density is changed by adjusting a rotational speed of the polygon motor 201 for fine adjustment of a magnification in the auxiliary scanning direction. As described above, when a rotational speed of the polygon motor 201 is changed, unless image formation is executed after a rotational speed of the polygon motor 201, namely a rotational speed of the polygon mirror 203 has been stabilized, a straight line in the write end side is bent, and also correction of a magnification in the main scanning direction becomes unstable. Specifically, when a rotational speed of the polygon motor 201 rotating at a constant rotational speed of 31496 rpm is changed by around ±2%, the stable state is accomplished within around 1 second, but when structure of the polygon motor is complicated or the polygon mirror 203 is large, a time of more than 1 second may be required.

In the digital synthesizer according to Embodiment 1, if it is required to change a rotational speed of the polygon mirror when switching the operation mode, change from the printer mode to the copy mode or from the copy mode to the printer mode is inhibited until a rotational speed of the polygon mirror 203 (polygon motor 201) is stabilized so that a stable image can be obtained. In other words, in the digital synthesizer according to Embodiment 1, when it is required to change a rotational speed of the polygon mirror 203, the system control unit 312 changes a rotational speed of the polygon mirror 203 and the processing for forming an image is executed after the rotational speed is stabilized, and when it is not required to change a rotational speed of the polygon mirror 203, controls are provided to each section so that the processing for forming an image can immediately be started.

By the way, the polygon motor 201 is controlled by a PLL circuit in the write drive control circuit 326 not shown herein, and when a rotational speed is changed by around 1 to 2%, a lock signal from the PLL circuit is kept unchanged (the lock signal does not become abnormal unless the rotation speed is changed by ±7% or more). Therefore, assuming a time required until a rotational speed of the polygon mirror 203 is stabilized and by presetting to this time, the processing for switching the operation mode can be executed after the preset time has passed.

However, in a case where a time required until rotation of the polygon mirror 203 is assumed and mode switching is executed after the preset time has passed, even if rotation of the polygon mirror 203 is stabilized before the preset time has passes, the mode switching must be executed after the assumed period of time passes. Therefore, in the digital synthesizer according to Embodiment 1, whether rotation of the polygon mirror 203 (polygon motor 201) is stable or not can directly be determined by means of the synchronism detection sensor 327 and the counter circuit 700 shown in FIG. 7. Namely, in the digital synthesizer according to Embodiment 1, whether rotation of the polygon mirror 203 is stable or not can be determined by using a value obtained by actually measuring a rotational speed of the polygon mirror 203.

Operations for switching the operation mode in the order of a) the processing for determination as to whether a rotational speed of the polygon mirror 203 has been stabilized or not, and b) the processing for switching the operation mode are described.

a) Processing for determining whether a rotational speed of the polygon mirror 203 has been stabilized or not The processing for determining whether a rotational speed of the polygon mirror 203 has been stabilized or not is executed in the counter circuit 700 by using a PMSYNC signal generated in the synchronism detection sensor 327.

The counter circuit 700 receives a PMSYNC signal for establishing synchronism to a write start position in the main scanning direction from the synchronism detection sensor 327 as well as to read timing by the CCD 107, and also receives a pixel clock with a frequency of 28 MHz.

In the counter circuit 700, a counter 701 receives pixel clocks and measures a cycle of a PMSYNC signal by counting the pixel clocks. It should be noted the interval between the PMSYNC signals is 317.5 µs when the write density is 400 dpi, and a count value when counting pixel clocks each with a frequency of 28 MHz is 8890 count.

A count value by the counter 701 is latched in the latch 702 in synchronism to the PMSYNC signal. The latch 702 preserves a count value previous to the count value being currently counted by the counter 701.

Then the comparator 703 receives a count value from the counter 701 in synchronism to the PMSYNC signal, receives the previous count value latched in the latch 702, compares the previous count value to the current count value, and outputs an unlock signal when a difference between the two is 0.05% or more. Herein, 0.05% is converted to 4 count because 8890×0.05% ≈4. Namely, when an unlock signal is outputted from the comparator 703 (when the unlock signal is not 0), it indicates that the polygon mirror 203 is not rotating stably.

It should be noted that non-uniformity or jitter in rotation of the polygon motor 201 is less than 1 clock, so that an unlock signal is not outputted when the polygon motor is rotating stably. Furthermore, when a cycle difference occurs due to variance in machining precision, sampling should be made once for every six cycles, or determination may be made according to a total value for one rotation.

The unlock signal outputted from the comparator 703 is inputted into the system control unit 312 and is used in the processing for switching the operation mode.

b) A specific example of the processing for switching the operation mode

Figure 8:
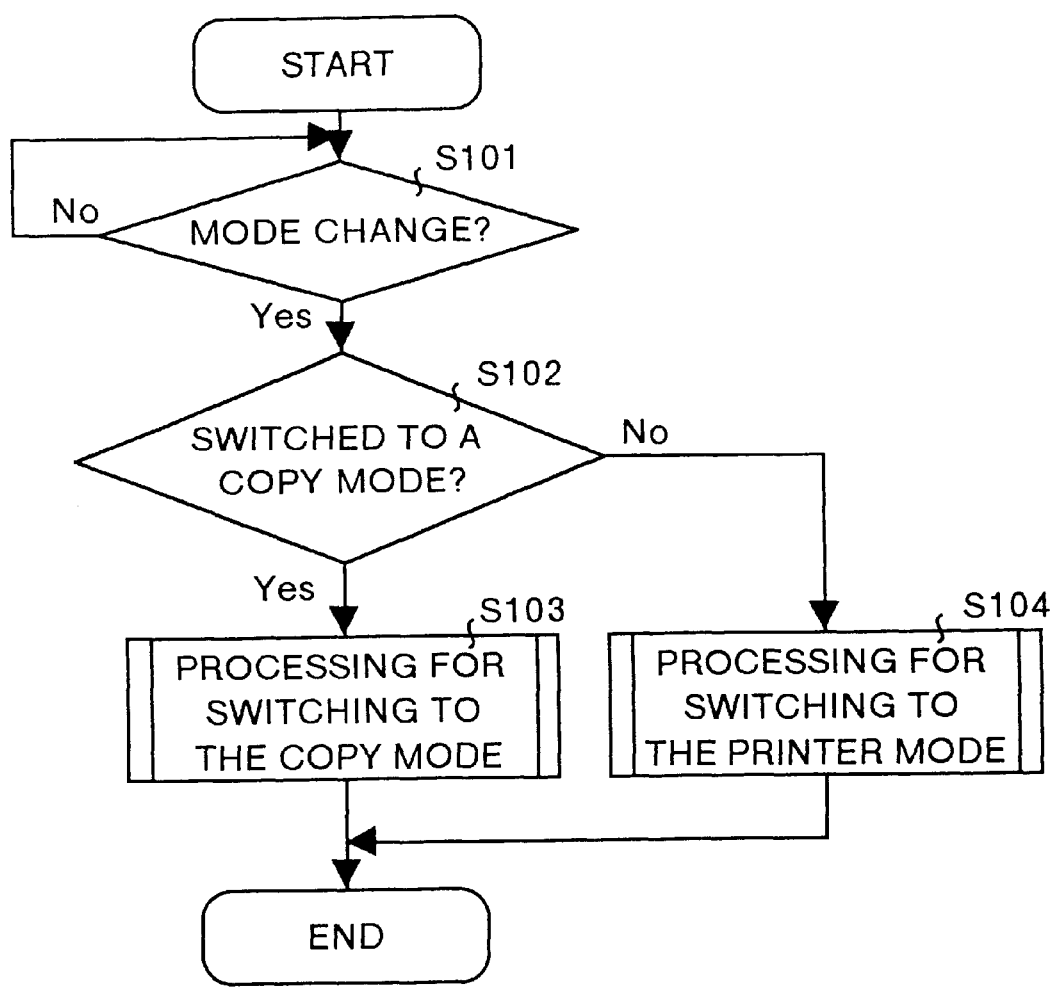
FIG. 8 is a flow chart showing the processing for switching an operation mode in the digital synthesizer according to Embodiment 1 of the present invention.

Specific example of the processing for switching the operation mode using an unlock signal outputted from the counter circuit 700 is described. FIG. 8 is a flow chart showing the processing for switching the operation mode.

At first, the system control unit 312 determines whether the operation mode is to be changed or not at a point of time when all digital image data has been written on the photosensitive drum 209 (S101). For instance, the operation mode is to be changed when a print request is issued from the computer 330 in the state where the copy mode is currently set, or when the copy mode button 501 is pressed in the state where the printer mode is currently set.

When it is determined in step S101 that the operation mode is not to be changed, the system control unit 312 executes a job (such as controls for reading a document or writing data onto recording paper) during the operation mode currently being executed.

On the other hand, when it is determined in step S101 that the operation mode is to be changed, the system control unit 312 determines whether the mode is changed to the copy mode or not (S102). When it is determined that the operation mode is changed to the copy mode, the system control unit 312 performs the processing in step S103, and execute the processing for switching the operation mode to the copy mode. When it is determined that the operation mode is not changed to the copy mode but changed to the printer mode, the system control unit 312 performs the processing in step S104, and executes the processing for switching the operation mode to the printer mode. Detailed description is made later or operations in step S103 and step S104 with reference to the flow chart.

The system control unit 312 terminates the processing for switching the operation mode when the processing for switching to the copy mode in step S103 or the processing for switching to the printer mode in step S104 is finished, and then execute the processing after switching.

Figure 9:
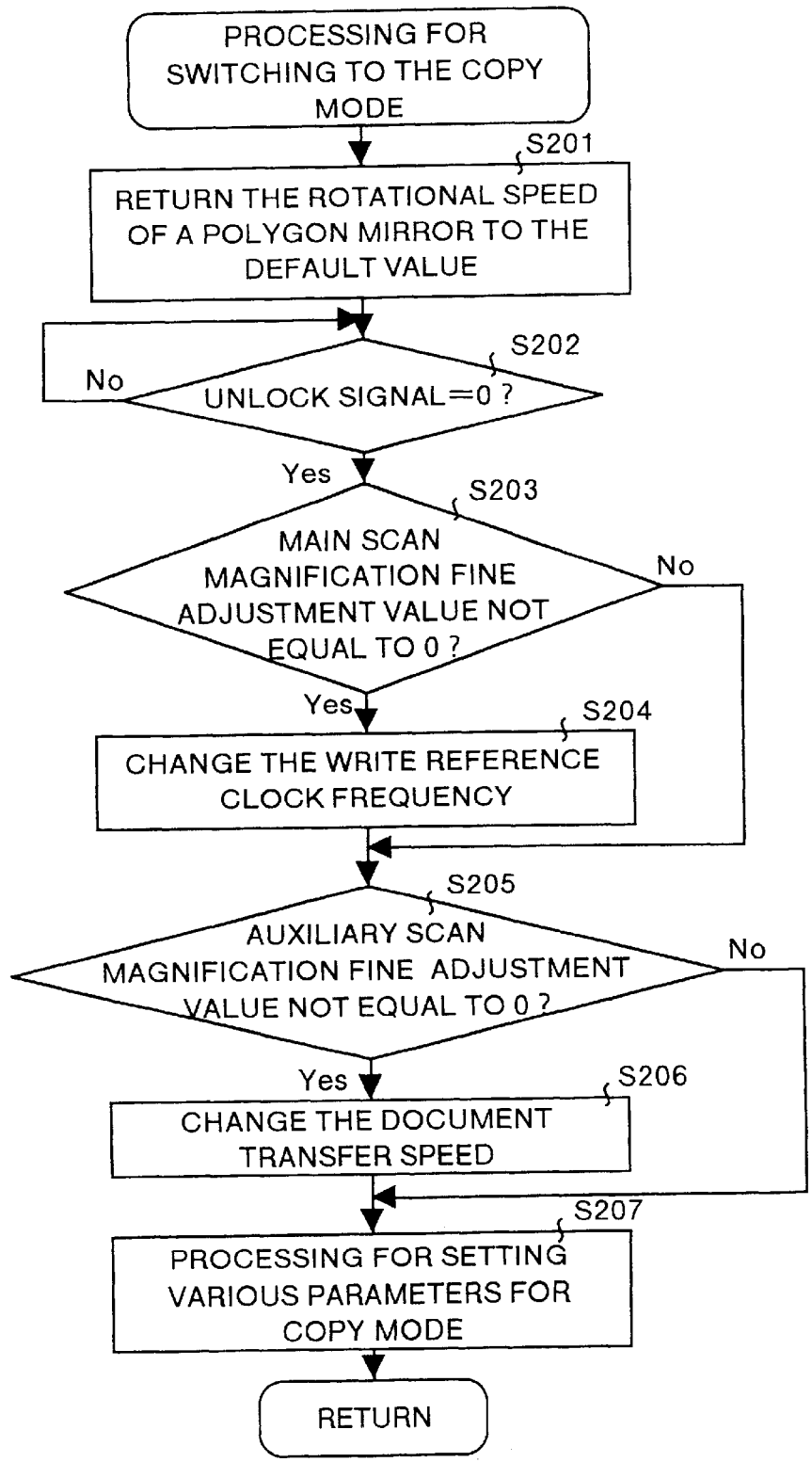
FIG. 9 is a flow chart showing the processing for switching to the copy mode showing in FIG. 8 (S103)

The processing for switching to the copy mode in step S103 shown in FIG. 8 is described. FIG. 9 is a flow chart showing the processing for switching to the copy mode.

When it is determined in step S103 shown in FIG. 8 that the operation mode after switching is the copy mode, the system control unit 312 controls the write drive control circuit 326 and executes the processing for returning a rotational speed of the polygon mirror to the default value (S201). As described above, in the copy mode, fine adjustment of a magnification of an image in the main scanning direction is made by changing a write reference clock frequency for the LD 324, and also fine adjustment of a magnification in the auxiliary scanning direction is made by changing a rotational speed of the motor 104 for transporting a document. On the other hand, in the printer mode, different from a case of the copy mode, fine adjustment of a magnification of an image in the auxiliary scanning direction is made by changing a rotational speed of the polygon mirror 203. Therefore, in association with switching from the printer mode to the copy mode, the processing for returning a rotational speed of the polygon mirror 203 changed in the printer mode to the default value is required in this step S201. When it is not required to change a rotational speed of the polygon mirror 203, however, the processing in step S201 and that in step S202 described below may be skipped.

Then the system control unit 312 determines whether the unlock signal is zero or not (step S202). Namely, in association with execution of the processing for returning a rotational speed of the polygon mirror 203 to the default rotational speed, the system control unit 312 determines whether the polygon mirror is rotating stably or not according to an unlock signal from the counter circuit 700.

When it is determined in step S203 that the unlock signal is not equal to zero, the system control unit 312 stands by until the unlock signal becomes zero. Specifically, the state where the unlock signal is not zero indicates that rotation of the polygon mirror 203 is unstable, and in this state, the system control unit 312 stands by until the state where the unlock signal is zero indicating stable rotation of the polygon mirror 203 is effected.

On the other hand, when the unlock signal is zero, the system control unit 312 determines whether a main scan magnification fine adjustment value set by a user is zero or not (S203). When it is determined that the main scan magnification fine adjustment value is zero, it is not required to make fine adjustment of magnification of an image in the main scanning direction by changing the write reference clock frequency for the LD 324, so that the system control unit 312 shifts to the processing in step S205 and continues the processing for switching the operation mode.

When it is determined in step S203 that the main scan magnification fine adjustment value is not zero, the system control unit 312 executes the processing for changing a write reference clock frequency according to the main scan magnification fine adjustment value set by a user using the magnification fine adjustment panel 352 shown in FIG. 6 (S204). Specifically the system control unit 312 inputs the clock generation control data generated according to the main scan magnification fine adjustment value set by the user into the write drive control circuit 326, and the write drive control circuit 326 generates a write reference clock for forming an image according to the inputted clock generation control data. It should be noted that, the clock generation control data inputted into the write drive control circuit 326 may be one generated according to a main scan magnification fine adjustment value previously inputted by a user, or may be one generated according to a main scan magnification fine adjustment value newly inputted by a user.

Then the system control unit 312 determines whether the auxiliary magnification fine adjustment value set by the user is zero or not (S205). When it is determined that the auxiliary magnification fine adjustment value is zero, as it is not necessary to execute fine adjustment of a magnification in the auxiliary scanning direction by changing a rotational speed of the motor 104 for transporting a document, the system control unit shifts to the processing in step S207 and continues the processing for switching the operation mode.

On the other hand, when it is determined that the auxiliary scan magnification fine adjustment value is not zero, the system control unit 312 executes the processing for changing a speed for transporting a paper according to the auxiliary scan magnification fine adjustment value set by the user with the magnification fine adjustment value shown in FIG. 6 (S206). Specifically, the system control unit 312 inputs the rotational speed control rate generated according to the auxiliary scan magnification fine adjustment value set by the user into the read control circuit 306, and the read control circuit 306 changes a rotational speed of the motor 104 for transporting a document when reading an image of the document according to the inputted rotational speed control data. It should be noted that the rotational speed control data inputted into the read control circuit 306 may be one generated according to the auxiliary scan magnification fine adjustment value previously inputted by a user or may be one generated according to the auxiliary scan magnification fine adjustment value inputted anew by the user.

Then the system control unit 312 executes various types of setting such as setting a path for image data for operating the digital synthesizer in the copy mode (S207). In this step S207, the processing for switching from the printer mode to the copy mode is completed, and the system control unit 312 terminates the processing for switching the operation mode.

Figure 10:
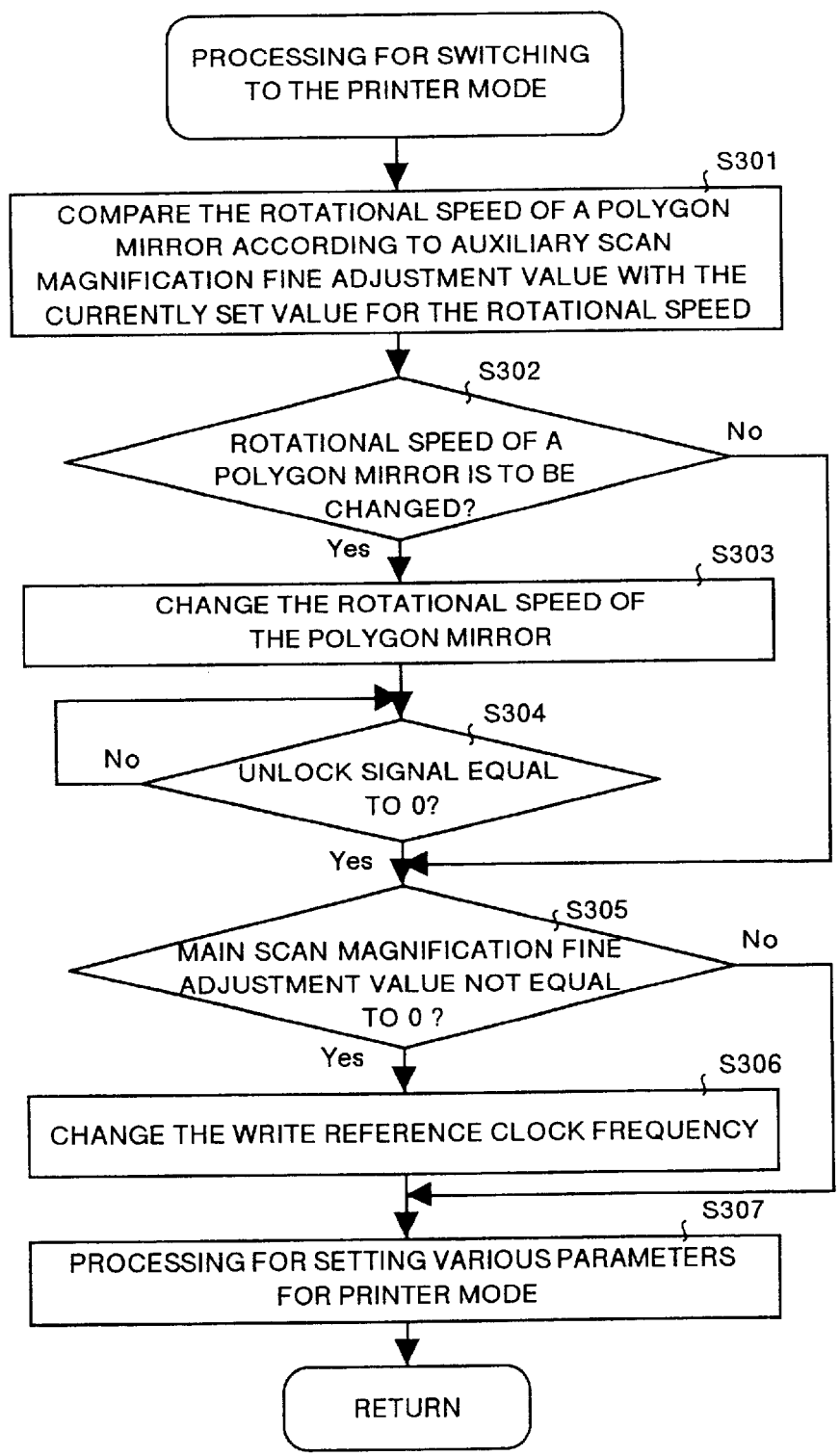
FIG. 10 is a flow chart showing the processing for switching to the printer mode in FIG. 8 (S104)

Processing for switching to the printer mode in step S104 shown in FIG. 8 is described. FIG. 10 is a flow chart showing the processing for switching to the printer mode.

When it is determined in step S104 in FIG. 8 that the operation mode after switching is not the copy mode but the printer mode, the system control unit 312 compares a rotational speed of the polygon mirror 203 according to the auxiliary scan magnification set value previously set to a current set value for a rotational speed of the polygon mirror (S301).

Then the system control unit 312 determines whether a rotational speed of the polygon mirror 203 is to be changed or not according to a result of comparison in step S301 (S302). When it is determined that a rotational speed of the polygon mirror 203 is not to be changed, the system control unit 312 shifts to the processing in step S305 and continues the processing for switching the operation mode.

On the other hand, when it is determined that the rotational speed of the polygon mirror 203 is to be changed, the system control unit 312 executes the processing for changing the rotational speed of the polygon mirror 203 (S303). Specifically, the system control unit 312 inputs a polygon motor rotational speed set value obtained from the magnification correction tables (Table 1 and Table 2) according to an auxiliary scan magnification fine adjustment value set by a user into the write drive control circuit 326, and the write control circuit 326 generates a drive clock according to the inputted polygon rotational speed set value and changes a rotational speed of the polygon motor 201 (polygon mirror 203) using the rotation control section 325. It should be noted that the polygon motor rotational speed set value inputted into the write drive control circuit 326 may be the one obtained according to an auxiliary scan magnification fine adjustment value previously inputted by a user or it may be the one obtained according to an auxiliary scan magnification fine adjustment value newly inputted by a user.

After the rotational speed of the polygon mirror 203 is changed in step S303, the system control unit 312 determines whether the unlock signal is equal to zero or not (S304). In other words, the system control unit 312 determines whether an unlock signal is being outputted from the counter circuit 700 or not in order to check whether the polygon motor 203 is stably rotating or not.

When it is determined in step S304 that the unlock signal is not equal zero, the system control unit 312 waits until the unlock signal becomes zero. A state when the unlock signal is not equal to zero indicates that the rotation of the polygon mirror 203 is not stable.

On the other hand, when it is determined that unlock signal is equal to zero, the system control unit 312 determines whether the main scan magnification fine adjustment value set by the user is equal to zero or not (S305). When the main scan magnification fine adjustment value is equal to zero, the system control unit 312 shifts the processing to step S307 and continues the processing for switching the operation mode.

When it is determined in step S305 that the main scan magnification fine adjustment value is not equal to zero, the system control unit 312 executes the processing for changing a write reference clock frequency according to a main scan magnification fine adjustment value set by the user (S306). Specifically, the system control unit 312 inputs a write clock frequency set value obtained from the magnification correction tables (Table 1 and Table 2) according to the main scan magnification fine adjustment value set by the user into the write drive control circuit 326, and the write drive control circuit 326 generates a write reference clock for forming an image according to the inputted write clock frequency set value. It should be noted that the write clock frequency set value inputted into the write drive control circuit 326 may be the one obtained according to a main scan magnification fine adjustment value previously inputted by a user or it may be the one obtained according to a main scan magnification fine adjustment value newly inputted by the user.

Then the system control unit 312 executes various types of setting for operating the digital synthesizer in the printer mode such as, for instance, setting of a path for image data (S307). In this step S307, the processing for switching from the copy mode to the printer mode is completed, and the system control unit 312 terminates the processing for switching the operation mode.

As described above, with the digital synthesizer according to Embodiment 1 of the present invention, a user can finely adjust a magnification so that a user can form an image with a desired magnification without any magnification error in the image. Therefore, a copy output or a printer output having only a negligible magnification error can be obtained. Especially, fine adjustment of a magnification can be executed according to different methods for a case where a digital synthesizer is used as a copying machine and for a case where the digital synthesizer is used as a printer respectively, so that a copy output and a printer output having high resolution and stable magnification can be obtained. In other words, as causes for generation of a magnification error during processing in the copy mode are different from those in the printer mode, a copy output and a printer output having a negligible magnification error can be obtained by controlling factors for generation of a magnification error in each operation mode.

As a result, by previously executing fine magnification of magnification when the digital synthesizer according to Embodiment 1 is installed, a copy output and a printer output having a negligibly small magnification error can be obtained by executing fine adjustment for a magnification according to expansion or shrinkage of a document as well as of recording paper due to change in the humidity. Although detailed description will not be made herein, for instance, by constructing a digital synthesizer so that a plurality of magnification fine adjustment values can be set according to the types of a recording paper or according to humidity, an optimal magnification fine adjustment value can easily be selected according to the situation, so that a copy output and a printer output having a negligibly small magnification error can easily be obtained.

Also when switching the operation mode from the copy mode to the printer mode or from the printer mode to the copy mode, if it is required to change a rotational speed of the polygon mirror 203, switching of the operation mode is executed after a rotational speed of the polygon mirror 203 is stabilized, so that it is possible to always form a stable image.

It should be noted that, although the above description concerning the processing for switching the operation mode was made with reference to the flow charts in FIG. 8 to FIG. 10, this is only one example of the processing for switching the operation mode, and if the processing for operation mode is executed after a rotational speed of the polygon mirror 203 is stabilized, a processing different from that in the flow charts shown in FIG. 8 to FIG. 10 may be employed. In other words, any type of processing may be employed on the condition that the processing for forming an image is executed after the rotational speed of the polygon mirror 203 is stabilized.

In the above description, as the image reader 100 constituting the digital synthesizer according to Embodiment 1 a type of image reader in which a document is moved is described, but it is needless to say that an image reader in which an image of a document is read by moving a scanner may be employed. Namely, when reading an image of a document, any type of image reader may be employed on the condition that a scanning speed in the auxiliary scanning direction can be adjusted.

Description is made below for a digital synthesizer having the function for fine adjustment of a magnification as Embodiment 2. The digital synthesizer according to Embodiment 2 of the present invention comprises an image reader and an image forming apparatus like in the digital synthesizer according to Embodiment 1, and a magnification of an image in the main scanning direction is adjusted by changing a write reference clock frequency, and a magnification of an image in the auxiliary scanning direction is adjusted by changing a rotational speed of a polygon mirror. It should be noted that the mechanical configuration of and the write optical system in the digital synthesizer according to Embodiment 2 is the same as those in the digital synthesizer according to Embodiment 1, so that detailed description thereof is omitted herein and FIG. 1, FIG. 2 and FIG. 4 will be referred.

Figure 11:
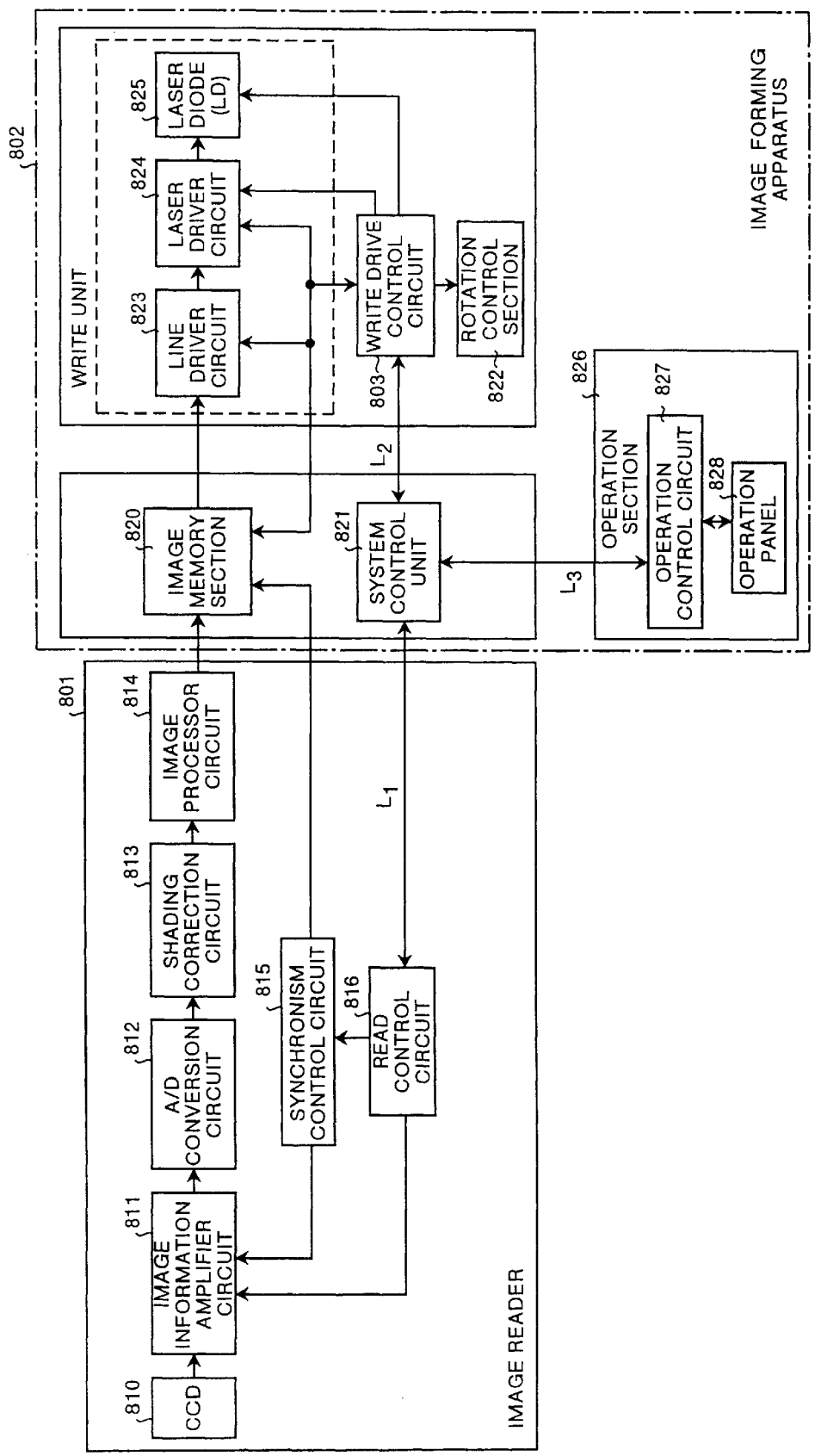
FIG. 11 is a block diagram showing a digital synthesizer according to Embodiment 2 of the present invention.

FIG. 11 is a block diagram showing configuration of the digital synthesizer according to Embodiment 2 of the present invention. An image reader 801 in the digital synthesizer according to Embodiment 2 comprises a CCD 810 for converting an image of a document with variable size to a multi-valued density signal, an image information amplifier circuit 811 for amplifying the density signal from the CCD 810, an A/D conversion circuit 812 for converting the amplified density signal to digital image data, a shading correction circuit 813, an image processor circuit 814, a synchronism control circuit 815 for controlling synchronism in the image read processing, and a read control circuit 816 for providing controls over a magnification for copying or the like. Output from the synchronism control circuit 815 is inputted into an image memory section 820 for partially storing therein image data in the image forming apparatus 802, and output from the read control circuit 816 is inputted into the image information amplifier circuit 811 and the system control unit 821 of the image forming apparatus 802.

The image forming apparatus 802 comprises a rotation control section 822 for operating the polygon motor 201 that rotates the polygon mirror 203 which reads out the image data partially stored in the image memory section 820 and make a laser beam modulated according to the image data on the photosensitive drum 209, and a write drive control circuit 803 having a write reference clock generating section, not shown in the figure, for generating a write reference clock for turning on or off the laser beam at a specified pixel density for controlling the rotation control section 822 and the write reference clock generating section (Refer to FIG. 4).

The image forming apparatus 802 further comprises an operation section 826 having an operation control circuit 827 and an operation panel 828. Configuration of the operation panel 828 is the same as that shown in FIG. 5 and FIG. 6 respectively, so that their detailed description is omitted. However, in the digital synthesizer according to Embodiment 2, the copy mode button 501 and printer mode button 502 shown in FIG. 5 are not required.

Operations of the digital copying machine according to Embodiment 2 are explained below. A document is read by the CCD 810 and is subjected to A/D conversion, and then to MTF correction and size change processing by 1% unit in the image processor circuit 814, and is send as an image data to the image memory section 820 in the image forming apparatus 802. Output from the image forming apparatus 802 is inputted into a line driver circuit 823 comprising a toggle buffer, and then modulates output from the laser diode (LD) 825 via the laser driver circuit 824 and generates a laser beam according to the image data.

The polygon mirror 203 has six faces and it rotates at 31496 rpm, and the rotation control section 822 that rotates the polygon mirror at the rotational speed is controlled according to a drive clock (for instance, 1049.869 Hz) corresponding to a rotational speed instruction signal from the write drive control circuit 803.

The write optical system has the configuration as shown in FIG. 4. In the following explanation, the write drive control circuit 326, the rotation control section 325 and the laser diode 324 as shown in FIG. 4 correspond to the write drive control circuit 803, the rotation control section 822 and the laser diode 825 as shown in FIG. 11, respectively. In FIG. 4, a laser beam from the laser diode 825 is modified by a collimate lens not shown in the figure to a parallel beam, and is reflected on surfaces of the polygon mirror 203. The laser beam reflected by the polygon mirror 203 is detected at first by the synchronism detection sensor 327, and the write drive control circuit 803 generates a synchronism detection signal according to the detected laser beam and decides a timing for a writing operation.

A write reference clock is generated by a write reference clock generating section having a PLL provided in the write drive control circuit 803, and for instance the frequency of this clock is 33 MHz. It should be noted that, as a write start position changes when a write reference clock is changed, the write start position is always controlled by the write drive control circuit 803 so that an image is always written at the center of the surface of the photosensitive drum 209.

An image of a document is read by the CCD 810 and is subjected to A/D conversion, and then to MTF correction and to size change processing by 1% unit in the image processor circuit 814, and the image memory section 820 for partially storing therein image data of the document send to the image forming apparatus 802 is a memory for absorbing a difference between a synchronous signal WLSYNC when reading with the synchronism control circuit 815 and an RLSYNC obtained in synchronism to one face of the polygon mirror 203 (a difference of 1% is generated between WLSTNC and RLSYNC when fine adjustment of 1% is carried out). Therefore, as a storage capacity of the image memory section 820, a storage capacity for storing image data of one page is not required, and the storage capacity is sufficient if it can absorb only the difference. For instance, assuming that the maximum write size is A2 and the processing speed is 200 mm/sec, the storage capacity of 2M bit is enough for 400 dpi.

When the "+" key and "−" key are pressed on the magnification fine adjustment panel (Refer to FIG. 6) provided adjacent to the operation panel 827 having the same configuration as that shown in FIG. 5, change of a copying magnification fine adjustment value from +1.0 to −1.0% is displayed by 0.1% step on the magnification fine adjustment panel. The copying magnification fine adjustment value is inputted into the system control unit 821 when a document is inserted into the image reader 801, and then is inputted into the write drive control circuit 803. The write drive control circuit 803 is adapted for changing the rotational speed of the polygon mirror 203 at a specified step, regardless of a copying magnification against a document, according to a copying magnification fine adjustment value and also changing a write reference clock for a laser beam in response to the rotational speed at a specified percentage.

The polygon mirror 203 has six faces and rotates at a rotational speed of 31496 rpm, and the rotation is controlled according to a drive clock (1049.869 Hz in this example) corresponding to a rotational speed instruction signal from the write drive control circuit 803. This drive clock can be changed according to a fine adjustment command from the system control unit 821 by 0.1% step in a range of ±1%.

As the write reference clock, a 33 MHz frequency generated by a write clock generating section in the write drive control circuit 803 is used, and the write reference clock can be changed by 0.1% step in a range of ±2%. As a variable range of the write reference clock is ±1%, when the clock is changed by ±(plus minus) 1% for fine adjustment in the auxiliary scanning direction, (minus plus) 1% change is required to cancel the change, so that totally ±2% variable range is required. When the write reference clock changes, a write start position changes, so that the write drive control circuit 803 controls a write start position in such a way that an image is always written at the center of the photosensitive drum 209.

A method for finely adjusting a copying magnification is described below. When fine adjustment of a copying magnification is made in the main scanning direction (in the "horizontal direction" on the magnification fine adjustment panel shown in FIG. 6), the write drive control circuit 803 can change only a write reference clock in a specified (0.1%) step. When fine adjustment of a copying magnification is made in the auxiliary scanning direction (in the "vertical" direction on the magnification fine adjustment panel shown in FIG. 6), however, if a rotational speed of the polygon motor 203 is changed in response to change in a copying magnification as a result of fine adjustment, time required for scanning one face of the polygon mirror 203 changes, so that also a magnification in the main scanning direction changes at the same percentage. Therefore, the write drive control circuit 803 changes a rotational speed of the polygon motor 201 and a write reference clock in correlation to each other. This control is executed as described below.

For instance, when a rotational speed of the polygon mirror 203 is set to 31496 rpm×0.999=31464.504 rpm to raise a magnification in the auxiliary scanning direction at the write reference by +0.1% to 100.1%, a magnification in the main scanning direction changes by −0.1%. To cancel it, it is required to lower the write reference clock by −0.1% to 33 MHz ÷1.001=32.967 MHz. When a copying magnification is finely adjusted by +0.5% in the auxiliary scanning direction, also a copying magnification in the main scanning direction is changed by −0.5%, so that, to restore the original magnification in the main scanning direction, it is necessary to change a copying magnification in the auxiliary scanning direction, namely the write reference clock by −0.5%. In addition, when a rotational speed of the polygon mirror 203 is raised to 31496 rpm×1.001=31527.496 rpm for finely adjusting copying magnification by −0.1% in the auxiliary scanning direction, it is required to set the write reference clock to 33 MHz×1.001=33.033 MHz. This relation, namely a relation ween a percentage of change of a rotational speed of the polygon mirror 203 and a percentage of change of the write reference clock in the auxiliary scanning direction is as shown the magnification correction tables shown in Table 3 and Table 4 below.

TABLE 3

| | | MAIN SCANNING DIRECTION | | | | | | | | | | |
|---|---|---|---|---|---|---|---|---|---|---|---|---|
| | | 1.0 | 0.9 | 0.8 | 0.7 | 0.6 | 0.5 | 0.4 | 0.3 | 0.2 | 0.1 | 0 |
| AUXILIARY | 1.0 | −1.0 | −1.0 | −1.0 | −1.0 | −1.0 | −1.0 | −1.0 | −1.0 | −1.0 | −1.0 | −1.0 |
| SCANNING | | 2.0 | 1.9 | 1.8 | 1.7 | 1.6 | 1.5 | 1.4 | 1.3 | 1.2 | 1.1 | 1.0 |
| DIRECTION | 0.9 | −0.9 | −0.9 | −0.9 | −0.9 | −0.9 | −0.9 | −0.9 | −0.9 | −0.9 | −0.9 | −0.9 |
| | | 1.9 | 1.8 | 1.7 | 1.6 | 1.5 | 1.4 | 1.3 | 1.2 | 1.1 | 1.0 | 0.9 |
| | 0.8 | −0.8 | −0.8 | −0.8 | −0.8 | −0.8 | −0.8 | −0.8 | −0.8 | −0.8 | −0.8 | −0.8 |
| | | 1.8 | 1.7 | 1.6 | 1.5 | 1.4 | 1.3 | 1.2 | 1.1 | 1.0 | 0.9 | 0.8 |
| | 0.7 | −0.7 | −0.7 | −0.7 | −0.7 | −0.7 | −0.7 | −0.7 | −0.7 | −0.7 | −0.7 | −0.7 |
| | | 1.7 | 1.6 | 1.5 | 1.4 | 1.3 | 1.2 | 1.1 | 1.0 | 0.9 | 0.8 | 0.7 |
| | 0.6 | −0.6 | −0.6 | −0.6 | −0.6 | −0.6 | −0.6 | −0.6 | −0.6 | −0.6 | −0.6 | −0.6 |
| | | 1.6 | 1.5 | 1.4 | 1.3 | 1.2 | 1.1 | 1.0 | 0.9 | 0.8 | 0.7 | 0.6 |
| | 0.5 | −0.5 | −0.5 | −0.5 | −0.5 | −0.5 | −0.5 | −0.5 | −0.5 | −0.5 | −0.5 | −0.5 |
| | | 1.5 | 1.4 | 1.3 | 1.2 | 1.1 | 1.0 | 0.9 | 0.8 | 0.7 | 0.6 | 0.5 |
| | 0.4 | −0.4 | −0.4 | −0.4 | −0.4 | −0.4 | −0.4 | −0.4 | −0.4 | −0.4 | −0.4 | −0.4 |
| | | 1.4 | 1.3 | 1.2 | 1.1 | 1.0 | 0.9 | 0.8 | 0.7 | 0.6 | 0.5 | 0.4 |

TABLE 3-continued

| | | | | | MAIN SCANNING DIRECTION | | | | | | |
|---|---|---|---|---|---|---|---|---|---|---|---|
| | | 1.0 | 0.9 | 0.8 | 0.7 | 0.6 | 0.5 | 0.4 | 0.3 | 0.2 | 0.1 | 0 |
| | 0.3 | -0.3 | -0.3 | -0.3 | -0.3 | -0.3 | -0.3 | -0.3 | -0.3 | -0.3 | -0.3 | -0.3 |
| | | 1.3 | 1.2 | 1.1 | 1.0 | 0.9 | 0.8 | 0.7 | 0.6 | 0.5 | 0.4 | 0.3 |
| | 0.2 | -0.2 | -0.2 | -0.2 | -0.2 | -0.2 | -0.2 | -0.2 | -0.2 | -0.2 | -0.2 | -0.2 |
| | | 1.2 | 1.1 | 1.0 | 0.9 | 0.8 | 0.7 | 0.6 | 0.5 | 0.4 | 0.3 | 0.2 |
| | 0.1 | -0.1 | -0.1 | -0.1 | -0.1 | -0.1 | -0.1 | -0.1 | -0.1 | -0.1 | -0.1 | -0.1 |
| | | 1.1 | 1.0 | 0.9 | 0.8 | 0.7 | 0.6 | 0.5 | 0.4 | 0.3 | 0.2 | 0.1 |
| | 0 | 0 | 0 | 0 | 0 | 0 | 0 | 0 | 0 | 0 | 0 | 0 |
| | | 1.0 | 0.9 | 0.8 | 0.7 | 0.6 | 0.5 | 0.4 | 0.3 | 0.2 | 0.1 | 0 |

| | | MAIN SCANNING DIRECTION | | | | | | | | | |
|---|---|---|---|---|---|---|---|---|---|---|---|
| | | -0.1 | -0.2 | -0.3 | -0.4 | -0.5 | -0.6 | -0.7 | -0.8 | -0.9 | -1.0 |
| AUXILIARY SCANNING DIRECTION | 1.0 | -1.0 | -1.0 | -1.0 | -1.0 | -1.0 | -1.0 | -1.0 | -1.0 | -1.0 | -1.0 |
| | | 0.9 | 0.8 | 0.7 | 0.6 | 0.5 | 0.4 | 0.3 | 0.2 | 0.1 | 0 |
| | 0.9 | -0.9 | -0.9 | -0.9 | -0.9 | -0.9 | -0.9 | -0.9 | -0.9 | -0.9 | -0.9 |
| | | 0.8 | 0.7 | 0.6 | 0.5 | 0.4 | 0.3 | 0.2 | 0.1 | 0 | -0.1 |
| | 0.8 | -0.8 | -0.8 | -0.8 | -0.8 | -0.8 | -0.8 | -0.8 | -0.8 | -0.8 | -0.8 |
| | | 0.7 | 0.6 | 0.5 | 0.4 | 0.3 | 0.2 | 0.1 | 0 | -0.1 | -0.2 |
| | 0.7 | -0.7 | -0.7 | -0.7 | -0.7 | -0.7 | -0.7 | -0.7 | -0.7 | -0.7 | -0.7 |
| | | 0.6 | 0.5 | 0.4 | 0.3 | 0.2 | 0.1 | 0 | -0.1 | -0.2 | -0.3 |
| | 0.6 | -0.6 | -0.6 | -0.6 | -0.6 | -0.6 | -0.6 | -0.6 | -0.6 | -0.6 | -0.6 |
| | | 0.5 | 0.4 | 0.3 | 0.2 | 0.1 | 0 | -0.1 | -0.2 | -0.3 | -0.4 |
| | 0.5 | -0.5 | -0.5 | -0.5 | -0.5 | -0.5 | -0.5 | -0.5 | -0.5 | -0.5 | -0.5 |
| | | 0.4 | 0.3 | 0.2 | 0.1 | 0 | -0.1 | -0.2 | -0.3 | -0.4 | -0.5 |
| | 0.4 | -0.4 | -0.4 | -0.4 | -0.4 | -0.4 | -0.4 | -0.4 | -0.4 | -0.4 | -0.4 |
| | | 0.3 | 0.2 | 0.1 | 0 | -0.1 | -0.2 | -0.3 | -0.4 | -0.5 | -0.6 |
| | 0.3 | -0.3 | -0.3 | -0.3 | -0.3 | -0.3 | -0.3 | -0.3 | -0.3 | -0.3 | -0.3 |
| | | 0.2 | 0.1 | 0 | -0.1 | -0.2 | -0.3 | -0.4 | -0.5 | -0.6 | -0.7 |
| | 0.2 | -0.2 | -0.2 | -0.2 | -0.2 | -0.2 | -0.2 | -0.2 | -0.2 | -0.2 | -0.2 |
| | | 0.1 | 0 | -0.1 | -0.2 | -0.3 | -0.4 | -0.5 | -0.6 | -0.7 | -0.8 |
| | 0.1 | -0.1 | -0.1 | -0.1 | -0.1 | -0.1 | -0.1 | -0.1 | -0.1 | -0.1 | -0.1 |
| | | 0 | -0.1 | -0.2 | -0.3 | -0.4 | -0.5 | -0.6 | -0.7 | -0.8 | -0.9 |
| | 0 | 0 | 0 | 0 | 0 | 0 | 0 | 0 | 0 | 0 | 0 |
| | | -0.1 | -0.2 | -0.3 | -0.4 | -0.5 | -0.6 | -0.7 | -0.8 | -0.9 | -1.0 |

UPPER ROW: ROTATION SPEED OF A POLYGON MOTOR
LOWER ROW: WRITE CLOCK REFERENCE FREQUENCY SET VALUE

TABLE 4

| | | MAIN SCANNING DIRECTION | | | | | | | | | | |
|---|---|---|---|---|---|---|---|---|---|---|---|---|
| | | 1.0 | 0.9 | 0.8 | 0.7 | 0.6 | 0.5 | 0.4 | 0.3 | 0.2 | 0.1 | 0 |
| AUXILIARY SCANNING DIRECTION | 0 | 0 | 0 | 0 | 0 | 0 | 0 | 0 | 0 | 0 | 0 | 0 |
| | | 1.0 | 0.9 | 0.8 | 0.7 | 0.6 | 0.5 | 0.4 | 0.3 | 0.2 | 0.1 | 0 |
| | -0.1 | 0.1 | 0.1 | 0.1 | 0.1 | 0.1 | 0.1 | 0.1 | 0.1 | 0.1 | 0.1 | 0.1 |
| | | 0.9 | 0.8 | 0.7 | 0.6 | 0.5 | 0.4 | 0.3 | 0.2 | 0.1 | 0 | -0.1 |
| | -0.2 | 0.2 | 0.2 | 0.2 | 0.2 | 0.2 | 0.2 | 0.2 | 0.2 | 0.2 | 0.2 | 0.2 |
| | | 0.8 | 0.7 | 0.6 | 0.5 | 0.4 | 0.3 | 0.2 | 0.1 | 0 | -0.1 | -0.2 |
| | -0.3 | 0.3 | 0.3 | 0.3 | 0.3 | 0.3 | 0.3 | 0.3 | 0.3 | 0.3 | 0.3 | 0.3 |
| | | 0.7 | 0.6 | 0.5 | 0.4 | 0.3 | 0.2 | 0.1 | 0 | -0.1 | -0.2 | -0.3 |
| | -0.4 | 0.4 | 0.4 | 0.4 | 0.4 | 0.4 | 0.4 | 0.4 | 0.4 | 0.4 | 0.4 | 0.4 |
| | | 0.6 | 0.5 | 0.4 | 0.3 | 0.2 | 0.1 | 0 | -0.1 | -0.2 | -0.3 | -0.4 |
| | -0.5 | 0.5 | 0.5 | 0.5 | 0.5 | 0.5 | 0.5 | 0.5 | 0.5 | 0.5 | 0.5 | 0.5 |
| | | 0.5 | 0.4 | 0.3 | 0.2 | 0.1 | 0 | -0.1 | -0.2 | -0.3 | -0.4 | -0.5 |
| | -0.6 | 0.6 | 0.6 | 0.6 | 0.6 | 0.6 | 0.6 | 0.6 | 0.6 | 0.6 | 0.6 | 0.6 |
| | | 0.4 | 0.3 | 0.2 | 0.1 | 0 | -0.1 | -0.2 | -0.3 | -0.4 | -0.5 | -0.6 |
| | -0.7 | 0.7 | 0.7 | 0.7 | 0.7 | 0.7 | 0.7 | 0.7 | 0.7 | 0.7 | 0.7 | 0.7 |
| | | 0.3 | 0.2 | 0.1 | 0 | -0.1 | -0.2 | -0.3 | -0.4 | -0.5 | -0.6 | -0.7 |
| | -0.8 | 0.8 | 0.8 | 0.8 | 0.8 | 0.8 | 0.8 | 0.8 | 0.8 | 0.8 | 0.8 | 0.8 |
| | | 0.2 | 0.1 | 0 | -0.1 | -0.2 | -0.3 | -0.4 | -0.5 | -0.6 | -0.7 | -0.8 |
| | -0.9 | 0.9 | 0.9 | 0.9 | 0.9 | 0.9 | 0.9 | 0.9 | 0.9 | 0.9 | 0.9 | 0.9 |
| | | 0.1 | 0 | -0.1 | -0.2 | -0.3 | -0.4 | -0.5 | -0.6 | -0.7 | -0.8 | -0.9 |
| | -1.0 | 1.0 | 1.0 | 1.0 | 1.0 | 1.0 | 1.0 | 1.0 | 1.0 | 1.0 | 1.0 | 1.0 |
| | | 0 | -0.1 | -0.2 | -0.3 | -0.4 | -0.5 | -0.6 | -0.7 | -0.8 | -0.9 | -1.0 |

| | | MAIN SCANNING DIRECTION | | | | | | | | | |
|---|---|---|---|---|---|---|---|---|---|---|---|
| | | -0.1 | -0.2 | -0.3 | -0.4 | -0.5 | -0.6 | -0.7 | -0.8 | -0.9 | -1.0 |
| AUXILIARY SCANNING DIRECTION | 0 | 0 | 0 | 0 | 0 | 0 | 0 | 0 | 0 | 0 | 0 |
| | | -0.2 | -0.3 | -0.4 | -0.5 | -0.6 | -0.7 | -0.8 | -0.9 | -1.0 | -1.1 |
| | -0.1 | 0.1 | 0.1 | 0.1 | 0.1 | 0.1 | 0.1 | 0.1 | 0.1 | 0.1 | 0.1 |
| | | -0.2 | -0.3 | -0.4 | -0.5 | -0.6 | -0.7 | -0.8 | -0.9 | -1.0 | -1.1 |
| | -0.2 | 0.2 | 0.2 | 0.2 | 0.2 | 0.2 | 0.2 | 0.2 | 0.2 | 0.2 | 0.2 |

TABLE 4-continued

|  | −0.3 | −0.4 | −0.5 | −0.6 | −0.7 | −0.8 | −0.9 | −1.0 | −1.1 | −1.2 |
|---|---|---|---|---|---|---|---|---|---|---|
| −0.3 | 0.3 | 0.3 | 0.3 | 0.3 | 0.3 | 0.3 | 0.3 | 0.3 | 0.3 | 0.3 |
|  | −0.4 | −0.5 | −0.6 | −0.7 | −0.8 | −0.9 | −1.0 | −1.1 | −1.2 | −1.3 |
| −0.4 | 0.4 | 0.4 | 0.4 | 0.4 | 0.4 | 0.4 | 0.4 | 0.4 | 0.4 | 0.4 |
|  | −0.5 | −0.6 | −0.7 | −0.8 | −0.9 | −1.0 | −1.1 | −1.2 | −1.3 | −1.4 |
| −0.5 | 0.5 | 0.5 | 0.5 | 0.5 | 0.5 | 0.5 | 0.5 | 0.5 | 0.5 | 0.5 |
|  | −0.6 | −0.7 | −0.8 | −0.9 | −1.0 | −1.1 | −1.2 | −1.3 | −1.4 | −1.5 |
| −0.6 | 0.6 | 0.6 | 0.6 | 0.6 | 0.6 | 0.6 | 0.6 | 0.6 | 0.6 | 0.6 |
|  | −0.7 | −0.8 | −0.9 | −1.0 | −1.1 | −1.2 | −1.3 | −1.4 | −1.5 | −1.6 |
| −0.7 | 0.7 | 0.7 | 0.7 | 0.7 | 0.7 | 0.7 | 0.7 | 0.7 | 0.7 | 0.7 |
|  | −0.8 | −0.9 | −1.0 | −1.1 | −1.2 | −1.3 | −1.4 | −1.5 | −1.6 | −1.7 |
| −0.8 | 0.8 | 0.8 | 0.8 | 0.8 | 0.8 | 0.8 | 0.8 | 0.8 | 0.8 | 0.8 |
|  | −0.9 | −1.0 | −1.1 | −1.2 | −1.3 | −1.4 | −1.5 | −1.6 | −1.7 | −1.8 |
| −0.9 | 0.9 | 0.9 | 0.9 | 0.9 | 0.9 | 0.9 | 0.9 | 0.9 | 0.9 | 0.9 |
|  | −1.0 | −1.1 | −1.2 | −1.3 | −1.4 | −1.5 | −1.6 | −1.7 | −1.8 | −1.9 |
| −1.0 | 1.0 | 1.0 | 1.0 | 1.0 | 1.0 | 1.0 | 1.0 | 1.0 | 1.0 | 1.0 |
|  | −1.1 | −1.2 | −1.3 | −1.4 | −1.5 | −1.6 | −1.7 | −1.8 | −1.9 | −2.0 |

UPPER ROW: ROTATION SPEED OF A POLYGON MOTOR
LOWER ROW: WRITE CLOCK REFERENCE FREQUENCY SET VALUE

As described above, a rotational speed of and a write reference clock for the polygon mirror 203 are required to be corrected according to a size change ratio in required copying magnification fine adjustment, so that resolution of up to 0.01% is required. When the resolution is short in a single PLL in the write reference clock generating section, it is possible to obtain high resolution by connecting two units of PLL serially, and fine adjustment of a magnification can be made without causing any trouble, which makes it possible to finely adjust a copying magnification in the main scanning direction as well as in the auxiliary scanning direction with high precision and high resolution and at the same time under stable conditions. Furthermore, as fine adjustment of a magnification can be carried out without changing a size of an image by executing the image processing as thinning data (when image size is reduced) or increasing data (when image size is increased), also a control program set in the write drive control circuit 803 can be simplified, and further low cost ICs can be used, which makes it possible to reduce cost of the apparatus as a whole.

In the digital synthesizer according to Embodiment 2 of the present invention, the write drive control circuit 803 can independently change a rotational speed of the polygon mirror 203 and a write reference clock at a specified step respectively regardless of a copying magnification of the document. Namely, fine adjustment of the magnification can be made by 0.1% unit within a range of ±1% against a density signal (output image) already having been subjected to size change in the image reader 801.

Specifically, when an image with a length of 400 mm on a document is to be reduced to that with a length of 200 mm but is actually changed to an image with a length of 199 mm, correction of +0.5% is required because 199/200=0.995, so that a fine adjustment value for a copying magnification, namely a correction ratio can easily be calculated. Accordingly, fine adjustment of a copying magnification can independently be made in the main scanning direction as well as in the auxiliary scanning direction respectively according to a correction ratio calculated as described above, and an image with desired size can easily be obtained.

In the digital synthesizer according to Embodiment 2, when zooming size change by 0.1% step is executed (the zooming size change is defined herein as changing a copying magnification by 0.1% step like 400.1%, 400.2%, 400.3% . . . ), the magnification fine adjustment panel shown in FIG. 6 is not used, and the configuration is allowable in which display of correction ratio including figures below a decimal point are added to display of the correction ratio and a zoom-up/down key is provided to enable increase or reduction by 0.1% step.

When the zooming size change is executed in the digital copier having the configuration as described above, assuming that the original copying magnification against a document is M, the write drive control circuit 803 multiplies a magnification for fine adjustment of the write reference clock by 1/M in fine adjustment of the copying magnification M. Namely, when a fraction for fine adjustment of the copying magnification M is inputted into the write drive control circuit 803, the write drive control circuit 803 changes the rotational speed of the polygon motor 201 and the write reference clock according to the copying magnification M already inputted therein and in response to the copying magnification fine adjustment value, multiplies the magnification in each step in fine adjustment to convert the magnification to the copying magnification M, and executes copying according to a new copying magnification obtained by adding the converted value to the copying magnification M.

Specifically, in a case of fine change of a write density during data write according to fine adjustment of a copying magnification, for instance size reduction by 0.1% for 400 dpi corresponds to writing at the pixel density of 400.4 dpi (=400×1.001), and enlargement of an image by 0.1% corresponds to writing at the pixel density of 399.6 dpi (=400×99.9), so that it is required to change the density signal value (output image) already subjected to size change of 0.1%. A 0.1% in size reduction by 50% corresponds to 50.05% (=50%×1.001), so that the change rate is 0.05% against the document, and on the contrary, when an image is enlarged by 400%, the actual magnification is 400.4% (=400%×1.01) indicating a change rate of 0.4% of the document. On the contrary, when the concept of zooming magnification by 0.1% step is applied, in the case of copying magnification of 0.1% described above, 400.1% corresponds to 400.0%, while 50.1% corresponds to 50.5%, so that a fine adjustment ratio must be corrected according to the copying magnification M. In other words, a fine adjustment portion of the copying magnification M is required to be multiplied by 1/M, so that 400.1*(=400%×(1+0.001/4)) is obtained for 400% and 50.1% (=(50%×(1+0.001/5)) is obtained for 50%. Namely, in the zooming magnification system, correction can be made by simply multiplying a fine adjustment magnification portion of the copying magnification M by 1/M.

As described above, with the digital synthesizer according to Embodiment 2 of the present invention, a write reference clock frequency is changed according to a preset magnification for fine adjustment, a copying magnification of the main scanning direction of a document is finely adjusted, and/or a rotational speed of a polygon mirror and a write reference clock are changed in correlation to each other. Therefore, the copying magnification in the auxiliary scanning direction of the document can be finely adjusted, so that a copying magnification in the main scanning direction as well as in the auxiliary scanning direction can finely be adjusted with high precision and high resolution and at the same time under stable conditions. Furthermore, fine adjustment of the magnification can be carried out without executing such image processing as data thinning (for size reduction) or data increase (for size enlargement), so that a program for finely adjusting a magnification can be simplified, which enables cost reduction of the apparatus.

In addition, the rotational speed of a polygon mirror and the write reference clock frequency can independently be changed in a specified step, regardless of a copying magnification of the document, so that fine adjustment of ±1% for each 0.1% step can be made for an output image already subjected to the size change processing. Furthermore, a magnification correction value for fine adjustment of a magnification can easily be calculated, and in addition, fine adjustment of magnification of an image can be made independently in the main scanning direction and in the auxiliary scanning direction respectively, so that an image with a desired size can easily be obtained.

Furthermore, when a copying magnification of a document is M, in fine adjustment of a copying magnification, a fine adjustment ratio for a write reference clock frequency and a rotational speed of a polygon mirror is multiplied by 1/M, so that, in a case of zooming size change, a specified zooming ratio (0.1%) can easily be obtained and a size change ratio previously obtained through calculation can be inputted. As the processing as described above can independently be executed in the main scanning direction and in the auxiliary scanning direction respectively, an image with a desired size can easily be obtained.

Before describing the Embodiment 3 of the present invention, a method of changing size of an image in a digital synthesizer is described. In a digital synthesizer the size is changed generally in the step of 1%, and the method is as described below.

① Size change by inputting dimensions: When a length of a document and a length of a portion to be copied are specified, the magnification is calculated and size is changed in steps of 1%.

② Sizechange according to a fixed magnification: This method is used for size change between A sizes and B sized in JIS (The values of 100%, 86%, 82%, 71%, 50%, 25%, 115%, 122%, 141%, 200%, 400% or the like are available as a size change ratio).

③ Zooming size change: A magnification can be selected in steps of 1%. For instance, when a range of a magnification is from 25 to 400%, there are 376 steps in all.

④ Size change by specifying a paper: When size of a paper is selected, the document size is automatically detected and the magnification is computed, and size is changed in steps of 1%.

By the way, when fine adjustment of a magnification is made by 0.1% step as described in Embodiment 1 and Embodiment 2, a magnification of an image formed by the method in which fine adjustment of a magnification is made when writing image data onto a photosensitive drum regardless of a magnification when the image is read (this method is described as "magnification correction" hereinafter) is different from that by method in which fine adjustment is made according to a copying magnification (described as "zooming size change" or "fine adjustment zooming" hereinafter) as described below.

For instance, when size change by 400% is executed, if fine adjustment by +0.1% is made by means of "magnification correction" when writing image data on a photosensitive drum, a magnification against the document is:

$$4(1+0.001) \times 100\% = 400.4\%.$$

In contrast, in a case of "zooming size change", size change is made against size of a document, so that, when fine adjustment by 0.1% is made, a magnification of a formed image is 400.1% against the document. Similarly, if fine adjustment by +0.1% is made when writing image data, a magnification of a formed image against the document is 400.4%. On the contrary, when size of an image is reduced by, for instance, 50%, the actual magnification is:

$$0.5(1+0.001) \times 100\% = 50.05\%,$$

but, in a case of "zooming size change", the magnification is 50.1%.

When viewed from practical operations, the following two cases are conceivable.

(a) The "zooming size change" is executed when length of a document to be enlarged or reduced is known and also a dimension after enlargement or size reduction is known. With this operation, a fraction of the size change ratio is absorbed up to the first digit below decimal point.

(b) When a document is copied with a fixed magnification previously specified as A3 to A4 (71%), A3 to A5 (50%), A4 to B5 (86%), B4 to A4 (82%) or the like as those used in size change between A sizes and B sizes based on JIS and a desired size can not be obtained due to shrinkage of a paper or for some other reasons, size of the paper after copying is measured and compared to a desired dimension to obtain the "corrected magnification value", and then copying is made again. For instance, when copying is made with a magnification of 50% but a length of 300 mm is reduced to 149 mm, the actual magnification is:

$$300 \times 0.5/149 \approx 1.007,$$

so that correction of +0.7% is required. In this case, "magnification correction" is easier to apply, and measurement of size of the document is not required.

When actual size of a document and that of a paper are inputted in order to calculate a magnification in "① size change by inputting dimensions", sometimes a fraction is generated according to the inputted numerical value, and if a fraction below 1% is rounded, a fine figure or table can not accurately be placed on a required place on a formed image. For instance, when a figure with length of 1900 mm is reduced to 115 mm, the magnification is 115/190=0.6053, but in the size changing method by 1% step, only 61% or 60% can be selected, and when 61% is selected, the size is 115.9 mm, and when 60% is selected, the size is 114 mm, so that an error of 1 mm from the desired size occurs. If the line length is longer, the error becomes larger. In this case, the error can be reduced to around 0.1 mm by combining the "size change by inputting dimensions" with the "zooming size change" or the "magnification correction".

Also in the "② size change according to a fixed magnification", in a case of a digital synthesizer enabling a size change in steps of 1%, a fraction below 1% is rounded, therefore, accurate size change can not be made. For instance, when a document with size A3 is reduced to that with size A4, the desired magnification is:

$$½^{1/2} ≈ 0.7071,$$

but the magnification is rounded to 71% in the actual operation, so that an error by 0.3% occurs. Also when a document with size A4 is enlarged to that with size A3, the desired magnification is:

$$2^{1/2} ≈ 1.4142$$

but the magnification is rounded to 141% in the actual operation, so that an error of 0.4% occurs. When a document with A4 size is reduced to that with B5 size, the desired magnification is:

$$(1.5/2)^{1/2} ≈ 0.866,$$

but the magnification is rounded to 86% in the actual operation, so that an error of 0.6% occurs. By compensating this fraction in the "zooming size change mode" as well as in the "magnification correction mode", the error can be reduced.

In Embodiment 3 of the present invention, description is made for a magnification control unit applicable to a copier, a printer, and a facsimile machine with improved convenience in the processing for finely adjusting a magnification by a magnification step smaller than, for instance, 0.1% with reference to a digital copier as an example.

The digital copier with the magnification control unit according to Embodiment 3 applied therein comprises, like that described in Embodiment 1, an image reader and an image forming apparatus. It should be noted that mechanical configuration or a write optical system of the digital copier according to Embodiment 3 are the same as those in Embodiment 1 as shown in FIG. 1, FIG. 2, and FIG. 4 and hence their detailed description is omitted.

Figure 12:
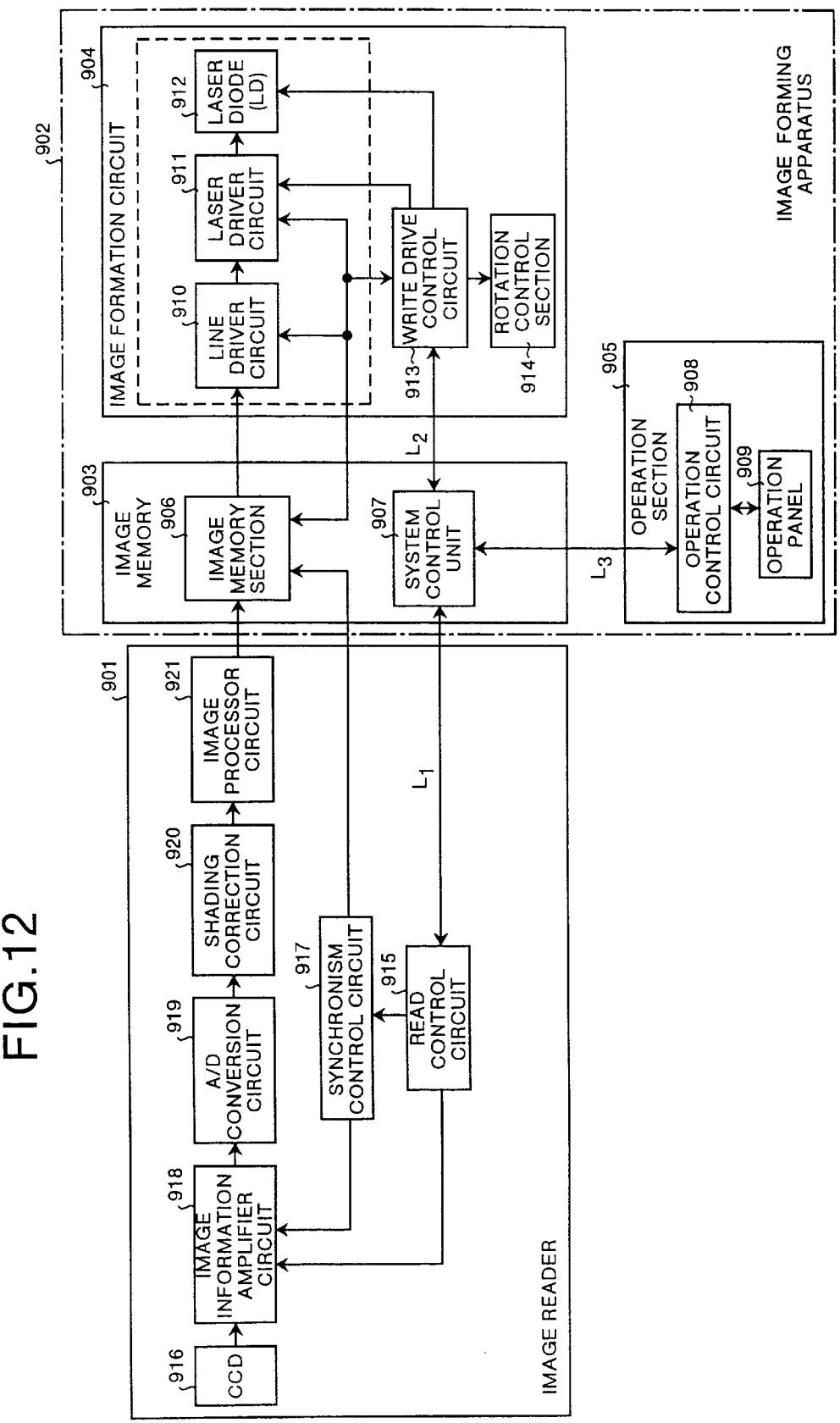
FIG. 12 is a block diagram showing a digital synthesizer with a magnification control unit applied therein according to Embodiment 3 of the present invention.

FIG. 12 is a block diagram showing configuration of the digital copier according to Embodiment 3 of the present invention. In FIG. 12, the digital copier basically comprises an image reader 901 for reading image data on a document, and an image forming apparatus 902 for copying the image data read by the image reader 901 on recording paper. The image forming apparatus 902 comprises an image memory 903 for storing therein image data read by the image reader 901, an image formation circuit 904 for copying image data read from the image memory 903 onto recording paper, and an operation section 905 for a user to set various types of copying mode or to provides various displays to the user.

Figure 13:
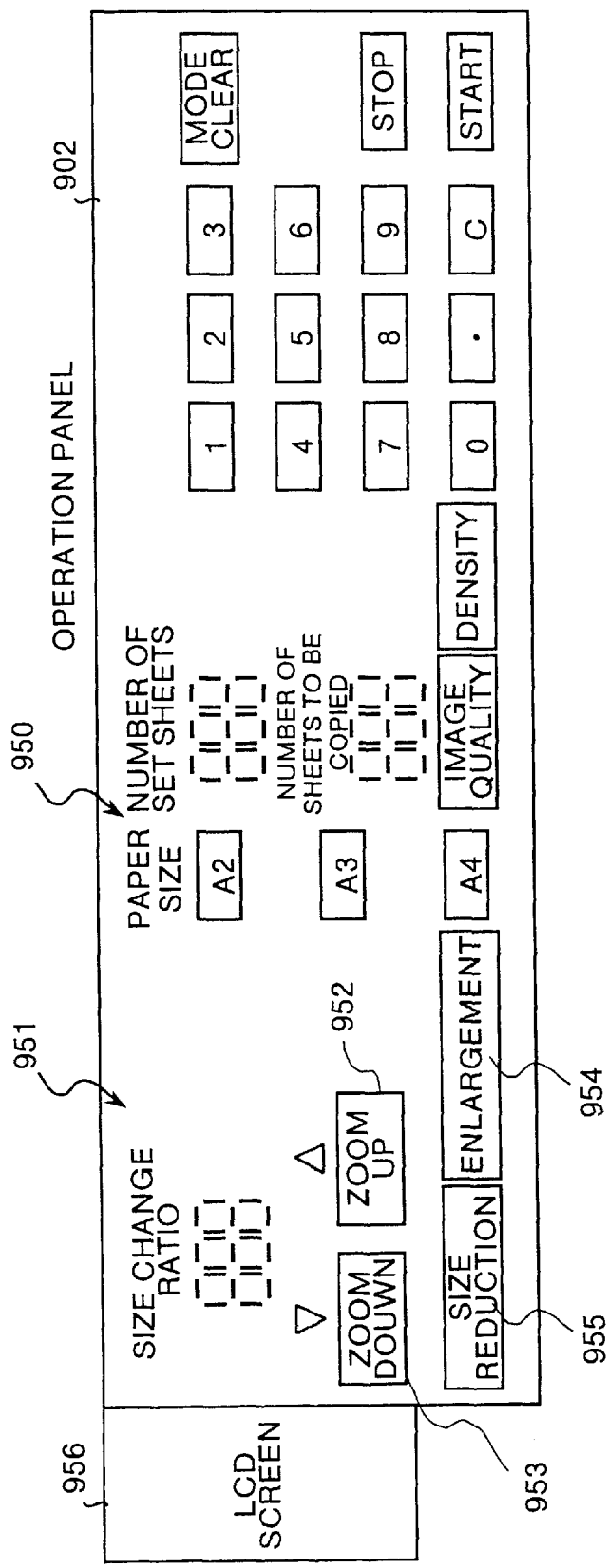
FIG. 13 shows in detail the operation panel shown in FIG. 12.
Figure 14A:
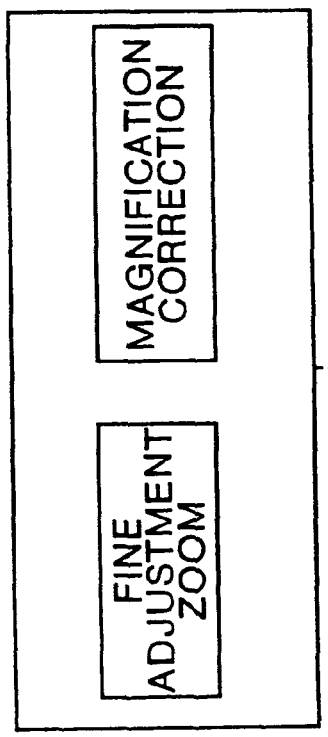
FIG. 14A to FIG. 14C are explanatory views showing a display screen of the LCD shown in FIG. 13.
Figure 14C:
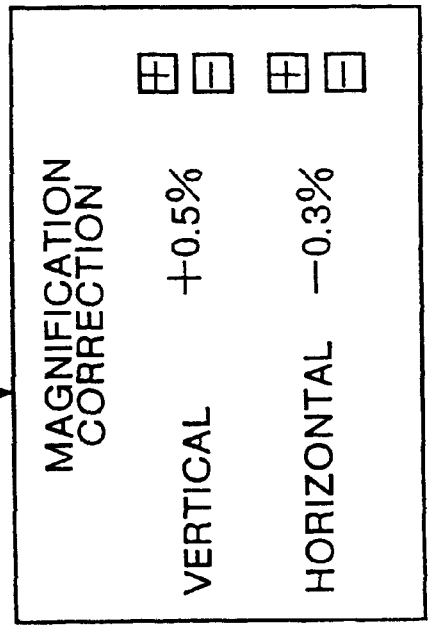
Figure 14B:
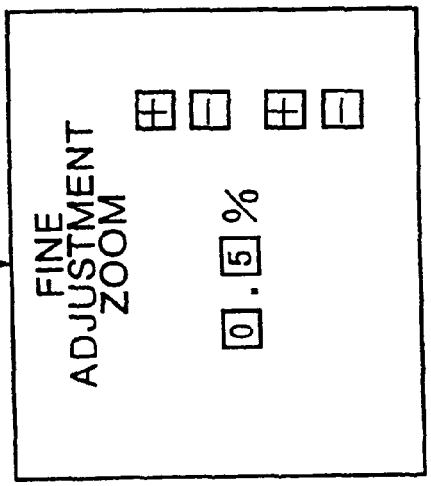

The image memory 903 comprises an image memory section 906 and a system control unit 907 for controlling the copier as a whole and especially providing controls for size change, and the operation section has an operation control circuit 908 and an operating panel 909 as shown in FIG. 13 and in FIGS. 14A to 14C. The image formation circuit 904 comprises a line driver circuit 910, a laser driver circuit 911, an LD (laser diode) 912, a write drive control circuit 913 and a rotation control section 914 for driving the write optical system described in Embodiment 1 and shown in FIG. 4 or the electronic photograph process mechanism shown in FIG. 2. The system control unit 907 executes serial data transfer via signal lines L1, L2 and L3 each based on the RS422 standard among the read control circuit 915 write drive control circuit 913, and operation control circuit 908.

As shown in FIG. 1, the image reader 901 is, for instance, of a document moving type, and a document is transported by the roller 101 on the contact glass 102 along a central line thereof as a reference. A surface of the document on the contract glass 102 is irradiated by a light source, and the reflected light is focused by a lens 106 and is converted to an analog image signal by the CCD 916. In the embodiment 3 of the present invention, the CCD 107 as shown in FIG. 1 corresponds to the CCD 916 as shown in FIG. 12.

A signal outputted from this CCD 916 is amplified by an image information amplifier circuit 918 under controls by a synchronism control circuit 917 and a read control circuit 915 as shown in FIG. 12, and then is converted to digital image data by an A/D conversion circuit 919. This image data is subjected to the processing by the shading correction circuit 920 for correcting errors caused due to non-uniformity of sensitivity in the CCD 916 or a light quantity distribution error due to the lens 106, and then is subjected to MTF correction, size change processing, processing for converting the image data to two-digit values or the like in the image processor circuit 921 and is transported to the image memory section 906.

The image data read out from the image memory section 906 is transported via the line driver circuit 910 having a toggle buffer and laser driver circuit 911 under controls by the write drive control circuit 913 and is modulated therein so that a beam from the LD 912 is weak for a section with low image data density and strong for a section with high image data density.

The write optical system has the configuration as shown in FIG. 4. In the following explanation, the write drive control circuit 326, the rotation control section 325 and the LD 324 as shown in FIG. 4 correspond to the write drive control circuit 913, the rotation control section 914 and the LD 912 as shown in FIG. 12, respectively. In FIG. 4. a light beam from the LD 912 is deflected at a constant angular speed by the polygon mirror 203 having six faces, then the directional displacement due to inclination of a surface is corrected by the cylindrical lens 204 and corrected by the f-θ lens 205 for constant speed deflection, and further reflected by the first mirror 206, second mirror 207 and third mirror 208 as shown in FIG. 2 and irradiated onto the photosensitive drum 209 previously electrified, thus a latent image is formed on the photosensitive drum 209. The out-going beam from the LD 912 is reflected by the synchronism detecting mirror 400 and received by the synchronism detecting sensor 327, thus a synchronism detection signal in the main scanning direction being generated.

In the write optical system, the polygon mirror 203 is rotated by the polygon motor 201, and the rotational speed of the polygon motor 201 is controlled by the write drive control circuit 913 and the rotation control section 914. The write reference clock for the LD 912 is controlled by the laser driver circuit 911.

In FIG. 2 described in Embodiment 2, a latent image on the photosensitive drum 209 is developed by the developing unit with a toner, and this toner is transported onto the electrifier 211 for transfer. The recording paper is previously set in the paper feed tray 212 and is fed by the feed roller 213. As the recording paper is cut by the cutter 214 into pieces each with desired length and is carried by the resist roller 215 so that the paper is aligned with the toner image on the photosensitive drum 209, and when the toner image is transferred by the electrifier 211 for transfer onto the recording paper, the toner image is fixed by the thermally fixing unit 216, and then the recording paper is discharged onto the discharge tray 217.

The operation panel 909 has keys and a display unit as those generally seen in a copying machine, and more specifically has a recording paper size key 950, a 1% step size change ratio display unit 951, a zoom-up key 952, a zoom-down key 953, an enlargement key 954, a reduction key 955, and an LCD screen 956 based on the touch panel system for displaying the screens as shown in FIGS. 14A to 14C when size is changed in steps of 0.1%.

With the configuration described above, when size is changed insteps of 1%, the size change is executed in the auxiliary scanning direction by changing an auxiliary scan speed of the image reader 901, and the size change in the main scanning direction is electrically executed by the image processor circuit 921. The image memory section 906 is used to absorb a difference between a read synchronous signal WLSYNC from the image reader and a synchronous. Signal RLSYNC obtained in synchronism to one face of the polygon mirror 203.

Herein, when size change by the maximum size change ratio of 1% is executed by 0.1% step, a difference of 1% between the synchronous signals WLSYNC and RLSYNC occurs. The image memory section 906 is used for absorbing this difference, and a storage capacity to store image data for one page is not required, but a storage capacity sufficient for fully absorbing the difference is required. For instance, assuming that the maximum write size is A1 and the process speed is 200 mm/sec, in a case of 400 dpi, an error with a range of ±1% can be absorbed with a storage capacity of 2M bits. When finely adjusted size change by 0.1% step is not executed, it is not required to provide the image memory section 906.

The six-faced polygon mirror 203 is driven by the polygon motor 201 at a rotational speed of 31496 rpm, and the rotational speed is controlled according to a drive clock (1049.869 Hz in this case) corresponding to a rotational speed specified by the write drive control circuit 913. The write drive control circuit 913 can change this drive clock by 0.1% step within a range from +1.0 to −1.0% according to a fine adjustment command from the system control unit 907.

The write timing for the LD 912 is decided according to a synchronism detection signal detected by the synchronism detecting sensor 327. The write reference clock for the LD 912 is generated with a frequency of 33 MHz by a PLL circuit in the write drive control circuit 913, and the maximum change of up to ±2% can be made by 0.1% step. Herein, when the write reference clock frequency changes, the write start position changes, therefore, the write drive control circuit 913 controls the write start position such that the image can be written at the center of the photosensitive drum 209.

A magnification adjustment signal in steps of 0.1% is generated by the system control unit 907 when a display screen of the LCD 956 shown in FIG. 13 and FIGS. 14A to 14C is operated by a user. In this case, soft keys of "fine adjustment zoom" and "magnification correction" are displayed on the LCD 956 as shown in FIG. 14A, and when the "fine adjustment key" is pressed, a specified magnification by 0.1% step, "+" key, and "−" key are displayed as shown in FIG. 14B. On the other hand, when the "magnification correction key" is pressed, as shown in FIG. 14C, a specified magnification by 0.1% step in the "vertical (auxiliary scanning direction)" and "horizontal (main scanning direction)", the "+" and "−" keys are displayed. With this display, a user can specify a magnification by 0.1% step within a range from +1.0 to −1.0%.

After the magnification is specified as described above and then a document is set on the image reader 901, data for magnification adjustment is transferred from the system control unit 907 to the write drive control circuit 913, and the write drive control circuit 913 changes both the rotational speed of the polygon mirror 203 and a write reference clock for the LD 912 according to the magnification adjustment data.

The size in the main scanning direction (in the vertical direction) can be changed by changing only the write reference clock in steps of 0.1%, but when a rotational speed of the polygon mirror 203 is changed for size change in the auxiliary scanning direction, a time required to scan one face of the mirror changes, so that it is necessary to change a magnification in the main scanning direction by the same magnification. For instance, when the magnification of 100% is changed to 100.1% by raising the magnification in the auxiliary scanning direction, a rotational speed of the polygon mirror 203 is changed to:

$$31464.504 \text{ rpm} = 31496 \text{ rpm} \times 0.999,$$

and in association with this change, also a magnification in the main scanning direction is changed by −0.1%. To cancel this change, the write reference clock must be lowered by 0.1% to:

$$32.967 \text{ MHz} = 33 \text{ MHz} \times 1.001$$

When a magnification in the auxiliary scanning direction is changed by +0.5%, a magnification in the main scanning direction is −0.5%, so that the write reference clock is corrected by −0.5% when the original magnification is required. To correct a magnification in the auxiliary scanning direction by −0.1%, a rotational speed of the polygon mirror 203 should be changed to:

$$31527.496 \text{ rpm} = 31496 \text{ rpm} \times 1.001.$$

In this step, the write reference clock is changed to:

$$33.033 \text{ MHz} = 33 \text{ MHz} \times 1.001.$$

This relation is shown in Table 5 and Table 6.

TABLE 5

| | | MAIN SCANNING DIRECTION | | | | | | | | | | |
|---|---|---|---|---|---|---|---|---|---|---|---|---|
| | | 1.0 | 0.9 | 0.8 | 0.7 | 0.6 | 0.5 | 0.4 | 0.3 | 0.2 | 0.1 | 0 |
| AUXILIARY | 1.0 | −1.0 | −1.0 | −1.0 | −1.0 | −1.0 | −1.0 | −1.0 | −1.0 | −1.0 | −1.0 | −1.0 |
| SCANNING | | 2.0 | 1.9 | 1.8 | 1.7 | 1.6 | 1.5 | 1.4 | 1.3 | 1.2 | 1.1 | 1.0 |
| DIRECTION | 0.9 | −0.9 | −0.9 | −0.9 | −0.9 | −0.9 | −0.9 | −0.9 | −0.9 | −0.9 | −0.9 | −0.9 |
| | | 1.9 | 1.8 | 1.7 | 1.6 | 1.5 | 1.4 | 1.3 | 1.2 | 1.1 | 1.0 | 0.9 |
| | 0.8 | −0.8 | −0.8 | −0.8 | −0.8 | −0.8 | −0.8 | −0.8 | −0.8 | −0.8 | −0.8 | −0.8 |
| | | 1.8 | 1.7 | 1.6 | 1.5 | 1.4 | 1.3 | 1.2 | 1.1 | 1.0 | 0.9 | 0.8 |
| | 0.7 | −0.7 | −0.7 | −0.7 | −0.7 | −0.7 | −0.7 | −0.7 | −0.7 | −0.7 | −0.7 | −0.7 |
| | | 1.7 | 1.6 | 1.5 | 1.4 | 1.3 | 1.2 | 1.1 | 1.0 | 0.9 | 0.8 | 0.7 |

TABLE 5-continued

| Aux | 1.0 | 0.9 | 0.8 | 0.7 | 0.6 | 0.5 | 0.4 | 0.3 | 0.2 | 0.1 | 0 |
|---|---|---|---|---|---|---|---|---|---|---|---|
| 0.6 | -0.6 | -0.6 | -0.6 | -0.6 | -0.6 | -0.6 | -0.6 | -0.6 | -0.6 | -0.6 | -0.6 |
|  | 1.6 | 1.5 | 1.4 | 1.3 | 1.2 | 1.1 | 1.0 | 0.9 | 0.8 | 0.7 | 0.6 |
| 0.5 | -0.5 | -0.5 | -0.5 | -0.5 | -0.5 | -0.5 | -0.5 | -0.5 | -0.5 | -0.5 | -0.5 |
|  | 1.5 | 1.4 | 1.3 | 1.2 | 1.1 | 1.0 | 0.9 | 0.8 | 0.7 | 0.6 | 0.5 |
| 0.4 | -0.4 | -0.4 | -0.4 | -0.4 | -0.4 | -0.4 | -0.4 | -0.4 | -0.4 | -0.4 | -0.4 |
|  | 1.4 | 1.3 | 1.2 | 1.1 | 1.0 | 0.9 | 0.8 | 0.7 | 0.6 | 0.5 | 0.4 |
| 0.3 | -0.3 | -0.3 | -0.3 | -0.3 | -0.3 | -0.3 | -0.3 | -0.3 | -0.3 | -0.3 | -0.3 |
|  | 1.3 | 1.2 | 1.1 | 1.0 | 0.9 | 0.8 | 0.7 | 0.6 | 0.5 | 0.4 | 0.3 |
| 0.2 | -0.2 | -0.2 | -0.2 | -0.2 | -0.2 | -0.2 | -0.2 | -0.2 | -0.2 | -0.2 | -0.2 |
|  | 1.2 | 1.1 | 1.0 | 0.9 | 0.8 | 0.7 | 0.6 | 0.5 | 0.4 | 0.3 | 0.2 |
| 0.1 | -0.1 | -0.1 | -0.1 | -0.1 | -0.1 | -0.1 | -0.1 | -0.1 | -0.1 | -0.1 | -0.1 |
|  | 1.1 | 1.0 | 0.9 | 0.8 | 0.7 | 0.6 | 0.5 | 0.4 | 0.3 | 0.2 | 0.1 |
| 0 | 0 | 0 | 0 | 0 | 0 | 0 | 0 | 0 | 0 | 0 | 0 |
|  | 1.0 | 0.9 | 0.8 | 0.7 | 0.6 | 0.5 | 0.4 | 0.3 | 0.2 | 0.1 | 0 |

MAIN SCANNING DIRECTION

| AUXILIARY SCANNING DIRECTION | -0.1 | -0.2 | -0.3 | -0.4 | -0.5 | -0.6 | -0.7 | -0.8 | -0.9 | -1.0 |
|---|---|---|---|---|---|---|---|---|---|---|
| 1.0 | -1.0 | -1.0 | -1.0 | -1.0 | -1.0 | -1.0 | -1.0 | -1.0 | -1.0 | -1.0 |
|  | 0.9 | 0.8 | 0.7 | 0.6 | 0.5 | 0.4 | 0.3 | 0.2 | 0.1 | 0 |
| 0.9 | -0.9 | -0.9 | -0.9 | -0.9 | -0.9 | -0.9 | -0.9 | -0.9 | -0.9 | -0.9 |
|  | 0.8 | 0.7 | 0.6 | 0.5 | 0.4 | 0.3 | 0.2 | 0.1 | 0 | -0.1 |
| 0.8 | -0.8 | -0.8 | -0.8 | -0.8 | -0.8 | -0.8 | -0.8 | -0.8 | -0.8 | -0.8 |
|  | 0.7 | 0.6 | 0.5 | 0.4 | 0.3 | 0.2 | 0.1 | 0 | -0.1 | -0.2 |
| 0.7 | -0.7 | -0.7 | -0.7 | -0.7 | -0.7 | -0.7 | -0.7 | -0.7 | -0.7 | -0.7 |
|  | 0.6 | 0.5 | 0.4 | 0.3 | 0.2 | 0.1 | 0 | -0.1 | -0.2 | -0.3 |
| 0.6 | -0.6 | -0.6 | -0.6 | -0.6 | -0.6 | -0.6 | -0.6 | -0.6 | -0.6 | -0.6 |
|  | 0.5 | 0.4 | 0.3 | 0.2 | 0.1 | 0 | -0.1 | -0.2 | -0.3 | -0.4 |
| 0.5 | -0.5 | -0.5 | -0.5 | -0.5 | -0.5 | -0.5 | -0.5 | -0.5 | -0.5 | -0.5 |
|  | 0.4 | 0.3 | 0.2 | 0.1 | 0 | -0.1 | -0.2 | -0.3 | -0.4 | -0.5 |
| 0.4 | -0.4 | -0.4 | -0.4 | -0.4 | -0.4 | -0.4 | -0.4 | -0.4 | -0.4 | -0.4 |
|  | 0.3 | 0.2 | 0.1 | 0 | -0.1 | -0.2 | -0.3 | -0.4 | -0.5 | -0.6 |
| 0.3 | -0.3 | -0.3 | -0.3 | -0.3 | -0.3 | -0.3 | -0.3 | -0.3 | -0.3 | -0.3 |
|  | 0.2 | 0.1 | 0 | -0.1 | -0.2 | -0.3 | -0.4 | -0.5 | -0.6 | -0.7 |
| 0.2 | -0.2 | -0.2 | -0.2 | -0.2 | -0.2 | -0.2 | -0.2 | -0.2 | -0.2 | -0.2 |
|  | 0.1 | 0 | -0.1 | -0.2 | -0.3 | -0.4 | -0.5 | -0.6 | -0.7 | -0.8 |
| 0.1 | -0.1 | -0.1 | -0.1 | -0.1 | -0.1 | -0.1 | -0.1 | -0.1 | -0.1 | -0.1 |
|  | 0 | -0.1 | -0.2 | -0.3 | -0.4 | -0.5 | -0.6 | -0.7 | -0.8 | -0.9 |
| 0 | 0 | 0 | 0 | 0 | 0 | 0 | 0 | 0 | 0 | 0 |
|  | -0.1 | -0.2 | -0.3 | -0.4 | -0.5 | -0.6 | -0.7 | -0.8 | -0.9 | -1.0 |

UPPER ROW: ROTATION SPEED OF A POLYGON MOTOR
LOWER ROW: WRITE CLOCK REFERENCE FREQUENCY SET VALUE

TABLE 6

MAIN SCANNING DIRECTION

| AUXILIARY SCANNING DIRECTION | 1.0 | 0.9 | 0.8 | 0.7 | 0.6 | 0.5 | 0.4 | 0.3 | 0.2 | 0.1 | 0 |
|---|---|---|---|---|---|---|---|---|---|---|---|
| -0.1 | 0.1 | 0.1 | 0.1 | 0.1 | 0.1 | 0.1 | 0.1 | 0.1 | 0.1 | 0.1 | 0.1 |
|  | 0.9 | 0.8 | 0.7 | 0.6 | 0.5 | 0.4 | 0.3 | 0.2 | 0.1 | 0 | -0.1 |
| -0.2 | 0.2 | 0.2 | 0.2 | 0.2 | 0.2 | 0.2 | 0.2 | 0.2 | 0.2 | 0.2 | 0.2 |
|  | 0.8 | 0.7 | 0.6 | 0.5 | 0.4 | 0.3 | 0.2 | 0.1 | 0 | -0.1 | -0.2 |
| -0.3 | 0.3 | 0.3 | 0.3 | 0.3 | 0.3 | 0.3 | 0.3 | 0.3 | 0.3 | 0.3 | 0.3 |
|  | 0.7 | 0.6 | 0.5 | 0.4 | 0.3 | 0.2 | 0.1 | 0 | -0.1 | -0.2 | -0.3 |
| -0.4 | 0.4 | 0.4 | 0.4 | 0.4 | 0.4 | 0.4 | 0.4 | 0.4 | 0.4 | 0.4 | 0.4 |
|  | 0.6 | 0.5 | 0.4 | 0.3 | 0.2 | 0.1 | 0 | -0.1 | -0.2 | -0.3 | -0.4 |
| -0.5 | 0.5 | 0.5 | 0.5 | 0.5 | 0.5 | 0.5 | 0.5 | 0.5 | 0.5 | 0.5 | 0.5 |
|  | 0.5 | 0.4 | 0.3 | 0.2 | 0.1 | 0 | -0.1 | -0.2 | -0.3 | -0.4 | -0.5 |
| -0.6 | 0.6 | 0.6 | 0.6 | 0.6 | 0.6 | 0.6 | 0.6 | 0.6 | 0.6 | 0.6 | 0.6 |
|  | 0.4 | 0.3 | 0.2 | 0.1 | 0 | -0.1 | -0.2 | -0.3 | -0.4 | -0.5 | -0.6 |
| -0.7 | 0.7 | 0.7 | 0.7 | 0.7 | 0.7 | 0.7 | 0.7 | 0.7 | 0.7 | 0.7 | 0.7 |
|  | 0.3 | 0.2 | 0.1 | 0 | -0.1 | -0.2 | -0.3 | -0.4 | -0.5 | -0.6 | -0.7 |
| -0.8 | 0.8 | 0.8 | 0.8 | 0.8 | 0.8 | 0.8 | 0.8 | 0.8 | 0.8 | 0.8 | 0.8 |
|  | 0.2 | 0.1 | 0 | -0.1 | -0.2 | -0.3 | -0.4 | -0.5 | -0.6 | -0.7 | -0.8 |
| -0.9 | 0.9 | 0.9 | 0.9 | 0.9 | 0.9 | 0.9 | 0.9 | 0.9 | 0.9 | 0.9 | 0.9 |
|  | 0.1 | 0 | -0.1 | -0.2 | -0.3 | -0.4 | -0.5 | -0.6 | -0.7 | -0.8 | -0.9 |
| -1.0 | 1.0 | 1.0 | 1.0 | 1.0 | 1.0 | 1.0 | 1.0 | 1.0 | 1.0 | 1.0 | 1.0 |
|  | 0 | -0.1 | -0.2 | -0.3 | -0.4 | -0.5 | -0.6 | -0.7 | -0.8 | -0.9 | -1.0 |

MAIN SCANNING DIRECTION

| AUXILIARY | -0.1 | -0.2 | -0.3 | -0.4 | -0.5 | -0.6 | -0.7 | -0.8 | -0.9 | -1.0 |
|---|---|---|---|---|---|---|---|---|---|---|
| -0.1 | 0.1 | 0.1 | 0.1 | 0.1 | 0.1 | 0.1 | 0.1 | 0.1 | 0.1 | 0.1 |

TABLE 6-continued

| | | -0.2 | -0.3 | -0.4 | -0.5 | -0.6 | -0.7 | -0.8 | -0.9 | -1.0 | -1.1 |
|---|---|---|---|---|---|---|---|---|---|---|---|
| SCANNING DIRECTION | -0.2 | 0.2 | 0.2 | 0.2 | 0.2 | 0.2 | 0.2 | 0.2 | 0.2 | 0.2 | 0.2 |
| | | -0.3 | -0.4 | -0.5 | -0.6 | -0.7 | -0.8 | -0.9 | -1.0 | -1.1 | -1.2 |
| | -0.3 | 0.3 | 0.3 | 0.3 | 0.3 | 0.3 | 0.3 | 0.3 | 0.3 | 0.3 | 0.3 |
| | | -0.4 | -0.5 | -0.6 | -0.7 | -0.8 | -0.9 | -1.0 | -1.1 | -1.2 | -1.3 |
| | -0.4 | 0.4 | 0.4 | 0.4 | 0.4 | 0.4 | 0.4 | 0.4 | 0.4 | 0.4 | 0.4 |
| | | -0.5 | -0.6 | -0.7 | -0.8 | -0.9 | -1.0 | -1.1 | -1.2 | -1.3 | -1.4 |
| | -0.5 | 0.5 | 0.5 | 0.5 | 0.5 | 0.5 | 0.5 | 0.5 | 0.5 | 0.5 | 0.5 |
| | | -0.6 | -0.7 | -0.8 | -0.9 | -1.0 | -1.1 | -1.2 | -1.3 | -1.4 | -1.5 |
| | -0.6 | 0.6 | 0.6 | 0.6 | 0.6 | 0.6 | 0.6 | 0.6 | 0.6 | 0.6 | 0.6 |
| | | -0.7 | -0.8 | -0.9 | -1.0 | -1.1 | -1.2 | -1.3 | -1.4 | -1.5 | -1.6 |
| | -0.7 | 0.7 | 0.7 | 0.7 | 0.7 | 0.7 | 0.7 | 0.7 | 0.7 | 0.7 | 0.7 |
| | | -0.8 | -0.9 | -1.0 | -1.1 | -1.2 | -1.3 | -1.4 | -1.5 | -1.6 | -1.7 |
| | -0.8 | 0.8 | 0.8 | 0.8 | 0.8 | 0.8 | 0.8 | 0.8 | 0.8 | 0.8 | 0.8 |
| | | -0.9 | -1.0 | -1.1 | -1.2 | -1.3 | -1.4 | -1.5 | -1.6 | -1.7 | -1.8 |
| | -0.9 | 0.9 | 0.9 | 0.9 | 0.9 | 0.9 | 0.9 | 0.9 | 0.9 | 0.9 | 0.9 |
| | | -1.0 | -1.1 | -1.2 | -1.3 | -1.4 | -1.5 | -1.6 | -1.7 | -1.8 | -1.9 |
| | -1.0 | 1.0 | 1.0 | 1.0 | 1.0 | 1.0 | 1.0 | 1.0 | 1.0 | 1.0 | 1.0 |
| | | -1.1 | -1.2 | -1.3 | -1.4 | -1.5 | -1.6 | -1.7 | -1.8 | -1.9 | -2.0 |

UPPER ROW: ROTATION SPEED OF A POLYGON MOTOR
LOWER ROW: WRITE CLOCK REFERENCE FREQUENCY SET VALUE

Switching the operation mode between the "fine adjustment zoom" and "magnification correction" is made on the screen of the LCD 956, and when the "1% magnification mode" is selected on the screen, a screen enabling choice among "size change by specifying a paper", "size change by inputting dimensions", "deflected size change", and "fine adjustment" is shown although the screen is not shown in the figure. In the mode of "size change by specifying a paper", size of a document and the paper is inputted successively, and a magnification is computed down to a decimal point upon completion of input. In this case, the operation mode automatically shifts to the "fine adjustment" mode.

When the "fine adjustment key" (not shown) is pressed on the LCD screen with the mode of "size change by specifying a paper" set thereon, the screen shifts to that on which either the "fine adjustment zoom" or "magnification correction" can be selected as shown in FIG. 14A. When a mode is selected, the screen as shown in FIG. 14B or in FIG. 14C is shown according to the selected operation mode.

In the "deflected size change" mode, the "fine adjustment zoom" can be applied to both a magnification in the vertical direction and that in the horizontal direction. In the case of "fixed size change" mode, if the enlargement key 954 or the reduction key 955 shown in FIG. 13 is pressed, a fixed magnification for enlargement or size reduction is selected with the screen in FIG. 14A shown, and a user can finely adjust a magnification according to the selected magnification. When the "fixed magnification" mode is selected, an instruction for a magnification by 0.1% and a corrected magnification below the decimal point are sent from the operation section 905 to the system control unit 907 and then from the system control unit 907 to the write drive control circuit 913, thus a rotational speed of the polygon mirror 203 and a write reference clock for the LD 912 is changed.

Figure 15:
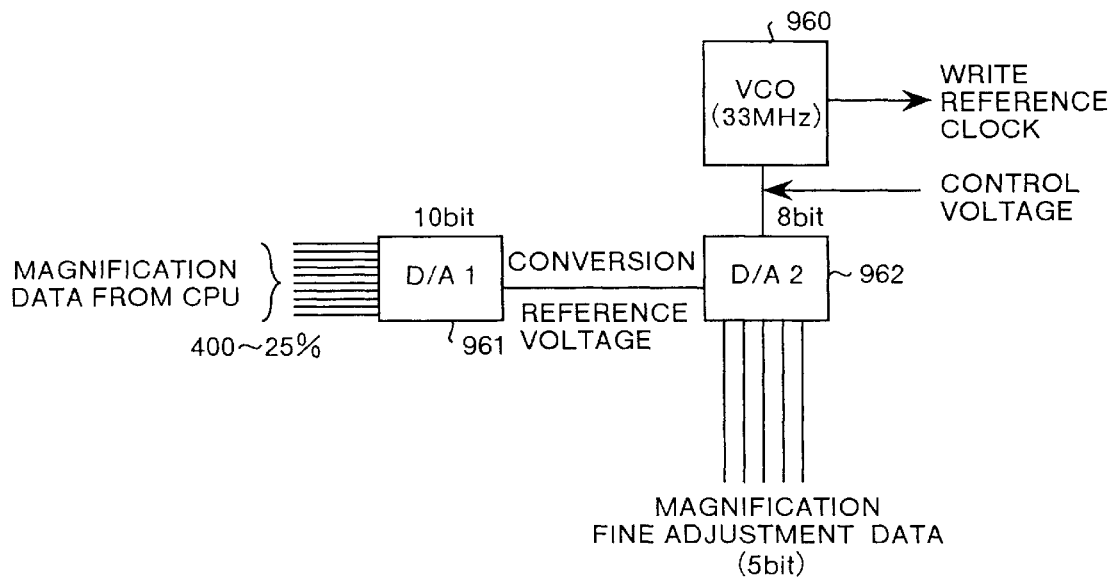
FIG. 15 is a block diagram showing an example of a write reference clock frequency generating circuit in the digital synthesizer with a magnification control unit applied therein according to Embodiment 3.
Figure 16:
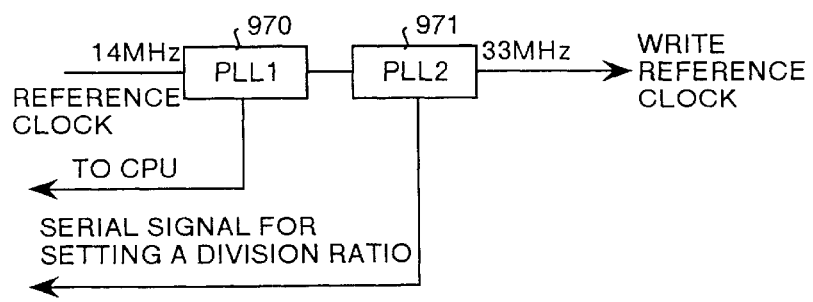
FIG. 16 is a block diagram showing another example of the write reference clock frequency generating circuit in the digital synthesizer with a magnification control unit applied therein according to Embodiment 3.

In the "fine adjustment zoom" mode, assuming that the copying magnification is M, conversion for correction to 1/M is executed. As a method of changing a rotational speed of the polygon mirror 203 and a write reference clock frequency for the LD 912, various methods are conceivable, and as a write reference clock generating circuit, a method of using the VOC (voltage control oscillator) as shown in FIG. 15 and the PCC circuits 970, 971 based on two-stage cascade connection as shown in FIG. 16 are conceivable. It should be noted that, although an approximate value for a desired write reference clock frequency can be obtained by connected the PLL circuits in two-stage cascade connection, but the fraction is rounded, so that an error occurs. However, the rotational speed of the polygon mirror 203 is sufficient to obtain required resolution with a one-stage PLL circuit because the reference frequency is lower than a write reference clock frequency.

Figure 17:
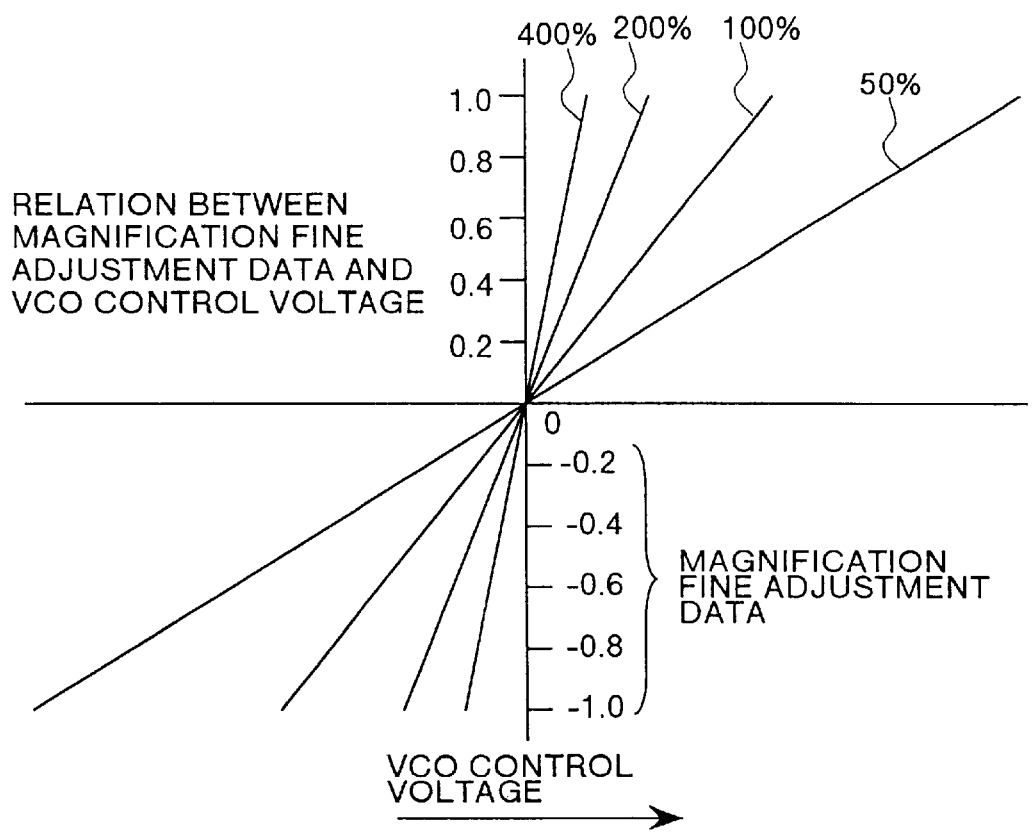
FIG. 17 is a graph of control voltage for the VCO and magnification fine adjustment data in FIG. 15.

FIG. 17 shows a relation between a control voltage for the VCO 960 shown in FIG. 15 and magnification adjustment data. A central value for control voltage for the VCO 960 varies according to characteristics of the VCO 960, but a voltage of around 5V is allowable. With the configuration as shown in FIG. 15, 10-bit magnification data in a range from 400 to 25% from a CPU in the system control unit 907 is converted to a reference voltage by the D/A converter 961, and then this reference voltage is converted by the D/A converter 962 to a control voltage for the VCO 960 according to 5-bit fine adjustment magnification data from the CPU. Output from the D/A converter 962 is changed in the + or − direction around 5V, assuming that a central value of the control voltage is 5V.

It should be noted that, by executing amplification or level shift by providing an operating amplifier or the like between the D/A converters 961, 962 and between the D/A converter 962 and VCO 960, a central frequency for control (33 MHz) can be slightly changed up and down around the central value. In the case of "magnification correction", the magnification is fixed by giving magnification data for 100% from the CPU. In addition, a rotational speed of the polygon mirror 203 can finely be adjusted by giving 100% fixed magnification data.

With the digital synthesizer with the magnification control unit according to Embodiment 3 applied therein, selection can be made between the size change processing by 1% and "magnification correction" and "fine adjustment zoom" by 0.1% step, so that the convenience in use can be improved. For instance, by selecting both the "1% zooming size change" and size change by fine adjustment by 0.1%, when copying is executed once in the "1% zooming size change" mode and size of a formed "image is different from the desired one", the magnification error can be corrected by selecting the "magnification correction by 0.1% step" mode.

As described above, the digital synthesizer according to the present invention comprises a mode switching unit for switching between a copy mode processing for reading image information from a document and forming an image according to the read image information and a printer mode processing for receiving arbitrary data from an external information processing device to generate image information for image formation and forming an image according to the generated image information; and a magnification fine adjustment unit for controlling different control objects in the copying mode processing and printer mode processing respectively and finely adjusting a magnification of an image to be formed. Thus, the magnification can finely be adjusted independently in each mode, therefore, a copy output and a printer output having a negligibly small magnification error can be obtained. Namely, causes for generating a magnification in the copy mode are different from those in the printer mode, so that a copy output and a printer output having a negligible magnification error can be obtained by controlling causes for generation of a magnification error in each mode.

With the digital synthesizer according to the present invention comprises a magnification fine adjustment unit for changing in the copy processing mode a frequency of the write reference clock by controlling the write reference clock generating unit to finely adjust a magnification of an image in the main scanning direction, and/or changing a scanning speed for reading an image from the document by controlling the image reading unit to finely adjust a magnification of an image in the auxiliary scanning direction; and further for changing in the printer mode processing a frequency of the write reference clock by controlling the write reference clock generating unit to change a frequency of the write reference clock to finely adjust a magnification of an image in the main scanning direction and/or changing a rotational speed of the polygon mirror by controlling the rotation control unit to finely adjust a magnification of an image in the auxiliary scanning direction. Thus, the magnification can finely be adjusted independently in each operation mode, therefore, a copy output and a printer output having a negligibly small magnification error can be obtained. Namely, causes for generation of magnification error in the copy mode are different from those in the printer mode, so that a copy output and a printer output having a negligibly small magnification error can be obtained by controlling causes for generation of a magnification error in each operation mode.

With the digital synthesizer according to the present invention, the magnification fine adjustment unit changes, when finely adjusting a magnification of an image in the auxiliary scanning direction in the printer mode processing, not only the rotational speed of the polygon mirror by controlling the rotation control unit, but also a frequency of the write reference clock by controlling the write reference clock generating unit. Therefore, the inconvenience that a magnification of an image in the main scanning direction is changed in association with a rotational speed of a polygon mirror can be overcome, and a printer output with a stable magnification can be obtained.

The digital synthesizer according to the present invention further comprises an adjustment value setting unit for setting an adjustment value as a reference for finely adjusting a magnification of an image to be formed in each of the copy mode processing and printer mode processing and the magnification fine adjustment unit finely adjusts the magnification of the image according to the adjustment value set by the adjustment value setting unit for making it possible for a user to finely adjust a magnification. Thus, a copy output and a printer output having a desired small magnification error can be obtained.

The digital synthesizer according to the present invention further comprises a stability determining unit for determining whether the polygon mirror is stably rotating or not when switching the copy mode processing to the printer mode processing or the printer mode processing to the copy mode processing; wherein the mode switching unit switches the processing to the other processing mode when it is determined by the stability determining unit that the polygon mirror is stably rotating. Thus, even in a case where it is required to switch a rotational speed of the polygon mirror when switching the operation mode, image formation can be executed after a rotational speed of the polygon mirror is stabilized. Therefore, it is possible to prevent the formation of an abnormal image due to instability in rotation of the polygon mirror.

The digital synthesizer according to the present invention further comprises a rotational speed determining unit for determining, when switching the copy mode processing to the printer mode processing or the printer mode processing to the copy mode processing, whether it is necessary to change a rotational speed of the polygon mirror according to the processing mode after switching; and a stability determining unit for determining, when rotational speed of the polygon mirror is changed by the rotation control unit, as to whether the polygon mirror is stably rotating or not; wherein the rotation control unit changes, when it is determined by the rotational speed determining unit that the rotational speed of the polygon mirror is to be changed, a rotational speed of the polygon mirror under control by the magnification fine adjustment unit, and the mode switching unit switches, when it is determined by the stability determining unit that the polygon mirror is stably rotating, the one processing mode to the other processing mode. Thus, even in a case where it is required to switch a rotational speed of the polygon mirror when switching the operation mode, image formation can be executed after a rotational speed of the polygon mirror is stabilized. Therefore, it is possible to prevent the formation of an abnormal image due to instability in rotation of the polygon mirror.

The digital synthesizer according to the present invention further comprises a detecting unit for detecting a rotational angle or a rotation cycle of the polygon mirror; wherein the stability determining unit determines according to a result of detection by the detecting unit, as to whether the polygon mirror is stably rotating or not. Thus, by determining whether a polygon mirror is stably rotating or not, it is possible to directly determine whether the polygon mirror is stably rotating or not. Therefore, as compared to a case where a time until a polygon mirror is preset and the operation mode is switched after the preset period of time passes, the operation mode can be switched within a far shorter period of time, and lowering of productivity associated with switching can be suppressed to the minimum level. In addition, the detecting unit for detecting a rotational angle or a rotation cycle of a polygon mirror is generally used in an image forming apparatus, so that cost of the apparatus can be reduced with the configuration simplified using the existing facilities by using this detecting unit for determination as to whether a rotary polygon mirror is rotating stably or not.

The digital copier according to the present invention comprises a write driving control unit for finely adjusting a copying magnification in the scanning direction of a document by controlling the write reference clock generating unit according to a preset copying magnification for fine adjustment, and/or for finely adjusting a copying magnification in the auxiliary scanning direction of a document by changing a rotational speed of the polygon mirror and a frequency of the write reference clock by controlling the rpm control unit and write reference clock generating unit.

Thus, a copying magnification in the main scanning direction as well as in the auxiliary scanning direction can finely be adjusted with high precision and high resolution under stable conditions. Also fine adjustment of a magnification can be made without executing the processing for size change with thinning data (for size reduction) or increasing the image data (for enlargement), so that a program for fine adjustment of a magnification can be simplified and the apparatus cost can be reduced.

With the digital copier according to the present invention, the write driving control unit changes a rotational speed of the polygon mirror and a frequency of the write reference clock in specified steps respectively, so that fine adjustment by 0.1% step can be made within a range of ±1% on an output image already having been subjected to size change. Furthermore, a magnification correction value for fine adjustment of a magnification can easily be calculated and also fine adjustment of a magnification can be made independently in both the main scanning direction and auxiliary scanning direction, and an image with desired size can easily be obtained.

With the digital copier according to the present invention, the write driving control unit multiplies a fine adjustment ratio of a frequency of the write reference clock and a rotational speed of the polygon mirror by 1/M times in fine adjustment of a copying magnification when a copying magnification against a document is M. Thus, in the zooming size change mode, a magnification can be converted to a specified (0.1%) zooming magnification. Therefore, a size change ratio previously obtained through calculation can be inputted. In addition, as the processing as described above can be made both in the main scanning direction and in the auxiliary scanning direction, an image with desired size can easily be obtained.

With the magnification control unit according to the present invention, a user can select either the processing for changing a rotational speed of a polygon mirror and a write reference clock frequency at a constant state regardless of a copying magnification or the processing for changing a rotational speed of a polygon mirror and a write reference clock frequency by each 1/M step (M: Copying magnification). Therefore, a user can realize operations for size change convenient for a user, and a user can easily obtain a copy output with a small magnification error desired by the user.

With the magnification control unit according to the present invention, when a particular mode of a plurality types of size change mode each with a relatively rough step is selected, the selected operation mode automatically shifts to a size change mode with a smaller magnification step. Thus, operations for size change convenient for a user can be realized, and copy output with a smaller magnification error as desired by a user can be obtained.

With the magnification control unit according to the present invention, a length of a document and a length of a portion to be copied are specified and the operation mode for size change with a relatively rough magnification step is selected by computing the magnification, the selected operation mode automatically shifts to the processing for size change with a smaller magnification step. Thus, operations for size change convenient for a user can be realized, and copy output with a smaller magnification error as desired by a user can be obtained.

With the magnification control system according to the present invention, when a fixed magnification is specified and the operation mode for size change with a relatively rough step is selected, the selected operation mode automatically shifts to the processing for size change with a smaller magnification step. Thus, the size change operations convenient for a user can be realized and copy output with a smaller magnification error as desired by a user can easily be obtained.

This application is based on Japanese patent applications No. HEI 9-315679, No. HEI 9-351802 and No. HEI 10-289733 filed in the Japanese Patent Office on Nov. 17, 1997, Dec. 19, 1997 and Oct. 12, 1998, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital synthesizer for performing at least a printer mode processing by receiving arbitrary data from an external information processing unit to generate image information for image formation and forming an image according to the generated image information, said digital synthesizer comprising:

a stability determining unit configured to determine whether a rotor for writing is stably rotating when switching from a printer mode processing to another processing mode or from the another processing mode to the printer mode processing, and to output a signal corresponding to a rotating state of said rotor; and a mode switching unit configured to switch the processing mode based on an unlock signal output when it is determined by said stability determining unit that said rotor is not stably rotating.

2. The digital synthesizer according to claim 1, wherein said stability determining unit is further configured to determine whether said rotor is stably rotating based on one of a rotational angle and a rotation cycle of said rotor.

* * * * *